(12) United States Patent
Liu et al.

(10) Patent No.: US 12,302,341 B2
(45) Date of Patent: May 13, 2025

(54) TECHNIQUES FOR GRANTING RESOURCES FOR NETWORK CODING PROCEDURES

(71) Applicant: QUALCOMM Incorporated, San Diego, CA (US)

(72) Inventors: Guangyi Liu, San Diego, CA (US); Shuanshuan Wu, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/586,483

(22) Filed: Jan. 27, 2022

(65) Prior Publication Data

US 2023/0239883 A1 Jul. 27, 2023

(51) Int. Cl.
*H04W 72/23* (2023.01)

(52) U.S. Cl.
CPC ............................ *H04W 72/23* (2023.01)

(58) Field of Classification Search
None
See application file for complete search history.

(56) References Cited

U.S. PATENT DOCUMENTS

| 10,193,727 B1 * | 1/2019 | Sung | H04L 27/2602 |
| 2015/0312927 A1 * | 10/2015 | Ko | H04B 7/024 |
| | | | 370/336 |
| 2019/0356446 A1 * | 11/2019 | Kim | H04L 5/0053 |
| 2020/0022173 A1 * | 1/2020 | Luo | H04L 5/0055 |
| 2020/0178199 A1 * | 6/2020 | Chae | H04B 7/0621 |
| 2020/0228247 A1 * | 7/2020 | Guo | H04L 1/0025 |
| 2021/0144582 A1 * | 5/2021 | Yi | H04W 72/23 |
| 2022/0007337 A1 * | 1/2022 | Lee | H04L 1/1822 |
| 2022/0256557 A1 * | 8/2022 | Kang | H04L 67/12 |
| 2022/0303821 A1 * | 9/2022 | Kang | H04W 28/0278 |
| 2022/0361227 A1 * | 11/2022 | Lee | H04L 1/1812 |
| 2023/0224931 A1 * | 7/2023 | Kim | H04W 56/002 |
| | | | 370/329 |
| 2023/0308219 A1 * | 9/2023 | Chen | H04L 1/0025 |
| 2023/0371109 A1 * | 11/2023 | Jang | H04B 7/06964 |
| 2024/0014943 A1 * | 1/2024 | Kuo | H04L 1/1822 |
| 2024/0015656 A1 * | 1/2024 | Do | H04W 76/28 |
| 2024/0063956 A1 * | 2/2024 | Ko | H04W 4/40 |

* cited by examiner

*Primary Examiner* — Adnan Baig
(74) *Attorney, Agent, or Firm* — Holland & Hart LLP/Qualcomm Incorporated

(57) ABSTRACT

Methods, systems, and devices for wireless communications are described. A wireless communications device, such as a roadside unit (RSU) or a user equipment (UE), may transmit a network coding packet on a sidelink to perform an efficient retransmission for multiple packets. In some systems, a base station may coordinate sidelink communications between devices, such as by granting resources for the devices to communicate on the sidelink. The device which transmits the network coding packet may request resources from the base station, and the base station may grant resources for the device to transmit the network coding packet. These techniques may be implemented to prevent the base station from granting resources to the original source UEs for retransmission.

30 Claims, 17 Drawing Sheets

TECHNIQUES FOR GRANTING RESOURCES FOR NETWORK CODING PROCEDURES

FIELD OF TECHNOLOGY

The following relates to wireless communications, including techniques for granting resources for network coding procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for granting resources for network coding procedures. Generally, the described techniques provide techniques to request resources for an efficient, network coding-based retransmission scheme. A wireless communications device may be capable of performing or transmitting a network coding message including a network coding packet. The wireless communication device may be a roadside unit (RSU) or a user equipment (UE), and the device may transmit a network coding packet on a sidelink to perform an efficient retransmission for multiple packets. For example, instead of having multiple UEs perform separate retransmissions to retransmit a set a transport blocks, the wireless communications device may retransmit the set of transport blocks in a single network coding message, including a network coding packet generated based on the set of transport blocks. In some cases, the network coding packet may be generated based on performing an operation, such as an exclusive or operation, on the set of transport blocks.

In some systems, a base station may coordinate sidelink communications between devices, such as by granting resources for the devices to communicate on the sidelink. The wireless communications device may transmit a request for resources to the base station, and the base station may transmit a grant allocated a set of resources for the wireless communications device to transmit the network coding message. In some cases, the request may indicate that the request is associated with network coding packet transmission. The base station may refrain from granting resources to the original source UEs of the set of transport blocks upon determining that the wireless communications device is handling the retransmission for the set of transport blocks. The grant may, in some cases, include identifiers of transport blocks for the wireless communications device to encode for the network coding message. The techniques described herein support schemes which are transparent to the base station and schemes which are non-transparent to the base station. For the transparent schemes, the base station may not be aware that retransmission is being handled by a network coding message from the wireless communications device. For the non-transparent schemes, the base station may be aware that retransmission is being handled by a network coding message from the wireless communications device.

A method for wireless communications at a wireless communications device is described. The method may include transmitting, to a base station, a request for resources to transmit, by the wireless communications device and to a set of multiple UEs, a network coding message that includes a network coding packet that is representative of a set of transport blocks that are coded together, receiving, from the base station and responsive to the request, a grant allocating a set of resources for network coding packet transmission, and transmitting the network coding message to the set of multiple UEs on the set of resources in accordance with the grant.

An apparatus for wireless communications at a wireless communications device is described. The apparatus may include a processor, memory coupled with the processor, and instructions stored in the memory. The instructions may be executable by the processor to cause the apparatus to transmit, to a base station, a request for resources to transmit, by the wireless communications device and to a set of multiple UEs, a network coding message that includes a network coding packet that is representative of a set of transport blocks that are coded together, receive, from the base station and responsive to the request, a grant allocating a set of resources for network coding packet transmission, and transmit the network coding message to the set of multiple UEs on the set of resources in accordance with the grant.

Another apparatus for wireless communications at a wireless communications device is described. The apparatus may include means for transmitting, to a base station, a request for resources to transmit, by the wireless communications device and to a set of multiple UEs, a network coding message that includes a network coding packet that is representative of a set of transport blocks that are coded together, means for receiving, from the base station and responsive to the request, a grant allocating a set of resources for network coding packet transmission, and means for transmitting the network coding message to the set of multiple UEs on the set of resources in accordance with the grant.

A non-transitory computer-readable medium storing code for wireless communications at a wireless communications device is described. The code may include instructions executable by a processor to transmit, to a base station, a request for resources to transmit, by the wireless communications device and to a set of multiple UEs, a network coding message that includes a network coding packet that is representative of a set of transport blocks that are coded together, receive, from the base station and responsive to the request, a grant allocating a set of resources for network coding packet transmission, and transmit the network coding message to the set of multiple UEs on the set of resources in accordance with the grant.

In some examples of the method, apparatuses, and non-transitory computer-readable medium described herein, transmitting the request may include operations, features, means, or instructions for transmitting a scheduling request associated with network coding packet transmission.

In some examples of the method, apparatuses, and non-transitory computer-readable medium described herein, transmitting the scheduling request may include operations, features, means, or instructions for transmitting, as the scheduling request, a sequence associated with network coding packet transmission.

In some examples of the method, apparatuses, and non-transitory computer-readable medium described herein, the sequence may be an orthogonal sequence unique to the wireless communications device.

Some examples of the method, apparatuses, and non-transitory computer-readable medium described herein may further include operations, features, means, or instructions for receiving, from the base station and prior to transmission of the scheduling request, an indication of the sequence, where the sequence may be associated with the wireless communications device based on the indication.

In some examples of the method, apparatuses, and non-transitory computer-readable medium described herein, the scheduling request may be transmitted using a group identifier associated with network coding packet transmission.

In some examples of the method, apparatuses, and non-transitory computer-readable medium described herein, the scheduling request may be transmitted on a resource associated with network coding packet transmission.

Some examples of the method, apparatuses, and non-transitory computer-readable medium described herein may further include operations, features, means, or instructions for transmitting, to the base station, an indication that the wireless communications device may be capable of network coding packet transmission and receiving, in response to the indication, control signaling from the base station configuring the resource associated with network coding packet transmission.

In some examples of the method, apparatuses, and non-transitory computer-readable medium described herein, the resource associated with network coding packet transmission may be unique to the wireless communications device or may be configured for a group of wireless communications devices including the wireless communications device.

In some examples of the method, apparatuses, and non-transitory computer-readable medium described herein, transmitting the request may include operations, features, means, or instructions for transmitting a buffer status report associated with network coding packet transmission.

In some examples of the method, apparatuses, and non-transitory computer-readable medium described herein, a bit in the buffer status report indicates that the buffer status report may be associated with network coding packet transmission.

In some examples of the method, apparatuses, and non-transitory computer-readable medium described herein, transmitting the request may include operations, features, means, or instructions for transmitting negative acknowledgment feedback associated with a set of multiple packets for the set of multiple UEs.

In some examples of the method, apparatuses, and non-transitory computer-readable medium described herein, the negative acknowledgment feedback includes an identifier associated with network coding packet transmission.

In some examples of the method, apparatuses, and non-transitory computer-readable medium described herein, the identifier may be associated with a packet identifier of the network coding packet.

Some examples of the method, apparatuses, and non-transitory computer-readable medium described herein may further include operations, features, means, or instructions for receiving control signaling from the base station configuring a dedicated resource for the request that may be associated with network coding packet transmission, where the request may be transmitted on the dedicated resource.

In some examples of the method, apparatuses, and non-transitory computer-readable medium described herein, the request includes one or more source identifiers of the set of transport blocks to be encoded in the network coding packet and one or more packet identifiers of the set of transport blocks to be encoded in the network coding packet.

In some examples of the method, apparatuses, and non-transitory computer-readable medium described herein, the request includes one or more additional source identifiers of additional transport blocks to be encoded in additional network coding packets, and one or more additional packet identifiers of the additional transport blocks.

In some examples of the method, apparatuses, and non-transitory computer-readable medium described herein, transmitting the request may include operations, features, means, or instructions for periodically transmitting the request.

Some examples of the method, apparatuses, and non-transitory computer-readable medium described herein may further include operations, features, means, or instructions for detecting a trigger to transmit the request, where the request may be transmitted based on detecting the trigger.

In some examples of the method, apparatuses, and non-transitory computer-readable medium described herein, receiving the grant may include operations, features, means, or instructions for receiving downlink control information including the grant, where the downlink control information indicates the set of transport blocks to encode for the network coding packet and a set of destination identifiers of the set of multiple UEs.

In some examples of the method, apparatuses, and non-transitory computer-readable medium described herein, receiving the grant may include operations, features, means, or instructions for receiving a radio resource control configuration message including the grant, where the radio resource control configuration message indicates the set of transport blocks to be encoded in the network coding packet and a set of destination identifiers of the set of multiple UEs.

In some examples of the method, apparatuses, and non-transitory computer-readable medium described herein, the grant indicates that the set of resources may be for network coding packet transmission.

In some examples of the method, apparatuses, and non-transitory computer-readable medium described herein, the grant indicates that the set of resources may be for network coding signaling based on a radio network temporary identifier associated with network coding packet transmission.

In some examples of the method, apparatuses, and non-transitory computer-readable medium described herein, the grant indicates that the set of resources may be for network coding packet transmission based on a field included with the grant.

In some examples of the method, apparatuses, and non-transitory computer-readable medium described herein, the grant indicates that the set of resources may be for network coding packet transmission based on a format of downlink control information including the grant.

In some examples of the method, apparatuses, and non-transitory computer-readable medium described herein, the grant may be transmitted using unicast signaling or multicast signaling.

In some examples of the method, apparatuses, and non-transitory computer-readable medium described herein, the request includes a set of transport block source identifiers for the set of transport blocks and a set of transport block packet identifiers for the set of transport blocks, and the network coding message includes one or more transport blocks of the set of transport blocks.

Some examples of the method, apparatuses, and non-transitory computer-readable medium described herein may further include operations, features, means, or instructions for receiving, from a source UE, a second request to transmit the network coding message that includes the network coding packet, where the request for the resources may be transmitted to the base station based on receiving the second request from the source UE.

Some examples of the method, apparatuses, and non-transitory computer-readable medium described herein may further include operations, features, means, or instructions for receiving a set of multiple packets from the set of multiple UEs, where the network coding message includes the network coding packet and one or more packets of the set of multiple packets.

A method for wireless communications at a base station is described. The method may include receiving, from a wireless communications device, a request for resources for the wireless communications device to transmit, by the wireless communications device to a set of multiple UEs, a network coding message that includes a network coding packet that is representative of a set of transport blocks that are coded together and transmitting, to the wireless communications device and responsive to the request, a grant allocating a set of resources for network coding packet transmission.

An apparatus for wireless communications at a base station is described. The apparatus may include a processor, memory coupled with the processor, and instructions stored in the memory. The instructions may be executable by the processor to cause the apparatus to receive, from a wireless communications device, a request for resources for the wireless communications device to transmit, by the wireless communications device to a set of multiple UEs, a network coding message that includes a network coding packet that is representative of a set of transport blocks that are coded together and transmit, to the wireless communications device and responsive to the request, a grant allocating a set of resources for network coding packet transmission.

Another apparatus for wireless communications at a base station is described. The apparatus may include means for receiving, from a wireless communications device, a request for resources for the wireless communications device to transmit, by the wireless communications device to a set of multiple user equipment (UEs), a network coding message that includes a network coding packet that is representative of a set of transport blocks that are coded together and means for transmitting, to the wireless communications device and responsive to the request, a grant allocating a set of resources for network coding packet transmission.

A non-transitory computer-readable medium storing code for wireless communications at a base station is described. The code may include instructions executable by a processor to receive, from a wireless communications device, a request for resources for the wireless communications device to transmit, by the wireless communications device to a set of multiple UEs, a network coding message that includes a network coding packet that is representative of a set of transport blocks that are coded together and transmit, to the wireless communications device and responsive to the request, a grant allocating a set of resources for network coding packet transmission.

In some examples of the method, apparatuses, and non-transitory computer-readable medium described herein, receiving the request may include operations, features, means, or instructions for receiving a scheduling request associated with network coding packet transmission.

In some examples of the method, apparatuses, and non-transitory computer-readable medium described herein, receiving the request may include operations, features, means, or instructions for receiving, as the scheduling request, a sequence associated with network coding packet transmission.

In some examples of the method, apparatuses, and non-transitory computer-readable medium described herein, the sequence may be an orthogonal sequence unique to the wireless communications device.

Some examples of the method, apparatuses, and non-transitory computer-readable medium described herein may further include operations, features, means, or instructions for transmitting, to the wireless communications device and prior to receiving the scheduling request, an indication of the sequence, where the sequence may be associated with the wireless communications device based on the indication.

In some examples of the method, apparatuses, and non-transitory computer-readable medium described herein, the scheduling request may be received using a group identifier associated with network coding packet transmission.

In some examples of the method, apparatuses, and non-transitory computer-readable medium described herein, the scheduling request may be received on a resource associated with network coding packet transmission.

Some examples of the method, apparatuses, and non-transitory computer-readable medium described herein may further include operations, features, means, or instructions for receiving, from the wireless communications device, an indication that the wireless communications device may be capable of network coding packet transmission and transmitting, in response to the indication, control signaling to the wireless communications device configuring the resource associated with network coding packet transmission.

In some examples of the method, apparatuses, and non-transitory computer-readable medium described herein, the resource associated with network coding packet transmission may be unique to the wireless communications device or may be configured for a group of wireless communications device s including the wireless communications device.

In some examples of the method, apparatuses, and non-transitory computer-readable medium described herein, receiving the request may include operations, features, means, or instructions for receiving a buffer status report associated with network coding packet transmission.

In some examples of the method, apparatuses, and non-transitory computer-readable medium described herein, a bit in the buffer status report indicates that the buffer status report may be associated with network coding packet transmission.

In some examples of the method, apparatuses, and non-transitory computer-readable medium described herein, receiving the request may include operations, features, means, or instructions for receiving negative acknowledgment feedback associated with a set of multiple packets for the set of multiple UEs.

In some examples of the method, apparatuses, and non-transitory computer-readable medium described herein, the negative acknowledgment feedback includes an identifier associated with network coding packet transmission.

In some examples of the method, apparatuses, and non-transitory computer-readable medium described herein, the identifier may be associated with a packet identifier of the network coding packet.

Some examples of the method, apparatuses, and non-transitory computer-readable medium described herein may further include operations, features, means, or instructions for transmitting control signaling to the wireless communications device configuring a dedicated resource for the request that may be associated with network coding packet transmission, where the request may be received on the dedicated resource.

In some examples of the method, apparatuses, and non-transitory computer-readable medium described herein, the request includes one or more source identifiers of the set of transport blocks to be encoded in the network coding packet and one or more packet identifiers of the set of transport blocks to be encoded in the network coding packet.

In some examples of the method, apparatuses, and non-transitory computer-readable medium described herein, the request includes one or more additional source identifiers of additional transport blocks to be encoded in additional network coding packets, and one or more additional packet identifiers of the additional transport blocks.

In some examples of the method, apparatuses, and non-transitory computer-readable medium described herein, the request may be received periodically.

In some examples of the method, apparatuses, and non-transitory computer-readable medium described herein, transmitting the grant may include operations, features, means, or instructions for transmitting downlink control information including the grant, where the downlink control information indicates the set of transport blocks to encode for the network coding packet and a set of destination identifiers of the set of multiple UEs.

In some examples of the method, apparatuses, and non-transitory computer-readable medium described herein, transmitting the grant may include operations, features, means, or instructions for transmitting a radio resource control configuration message including the grant, where the radio resource control configuration message indicates the set of transport blocks to be encoded in the network coding packet and a set of destination identifiers of the set of multiple UEs.

In some examples of the method, apparatuses, and non-transitory computer-readable medium described herein, the grant indicates that the set of resources may be for network coding packet transmission.

In some examples of the method, apparatuses, and non-transitory computer-readable medium described herein, the grant indicates that the set of resources may be for network coding signaling based on a radio network temporary identifier associated with network coding packet transmission.

In some examples of the method, apparatuses, and non-transitory computer-readable medium described herein, the grant indicates that the set of resources may be for network coding packet transmission based on a field included with the grant.

In some examples of the method, apparatuses, and non-transitory computer-readable medium described herein, the grant indicates that the set of resources may be for network coding packet transmission based on a format of downlink control information including the grant.

In some examples of the method, apparatuses, and non-transitory computer-readable medium described herein, the grant may be transmitted using unicast signaling or multicast signaling.

Some examples of the method, apparatuses, and non-transitory computer-readable medium described herein may further include operations, features, means, or instructions for receiving, from a first UE of the set of multiple UEs, a negative acknowledgment for at least a first packet transmitted by a second UE to the first UE, receiving, from the second UE, an acknowledgment for at least the first packet, and refraining from allocating a resource to the second UE for retransmitting at least the first packet based on receiving the acknowledgment.

DETAILED DESCRIPTION

Figure 1:
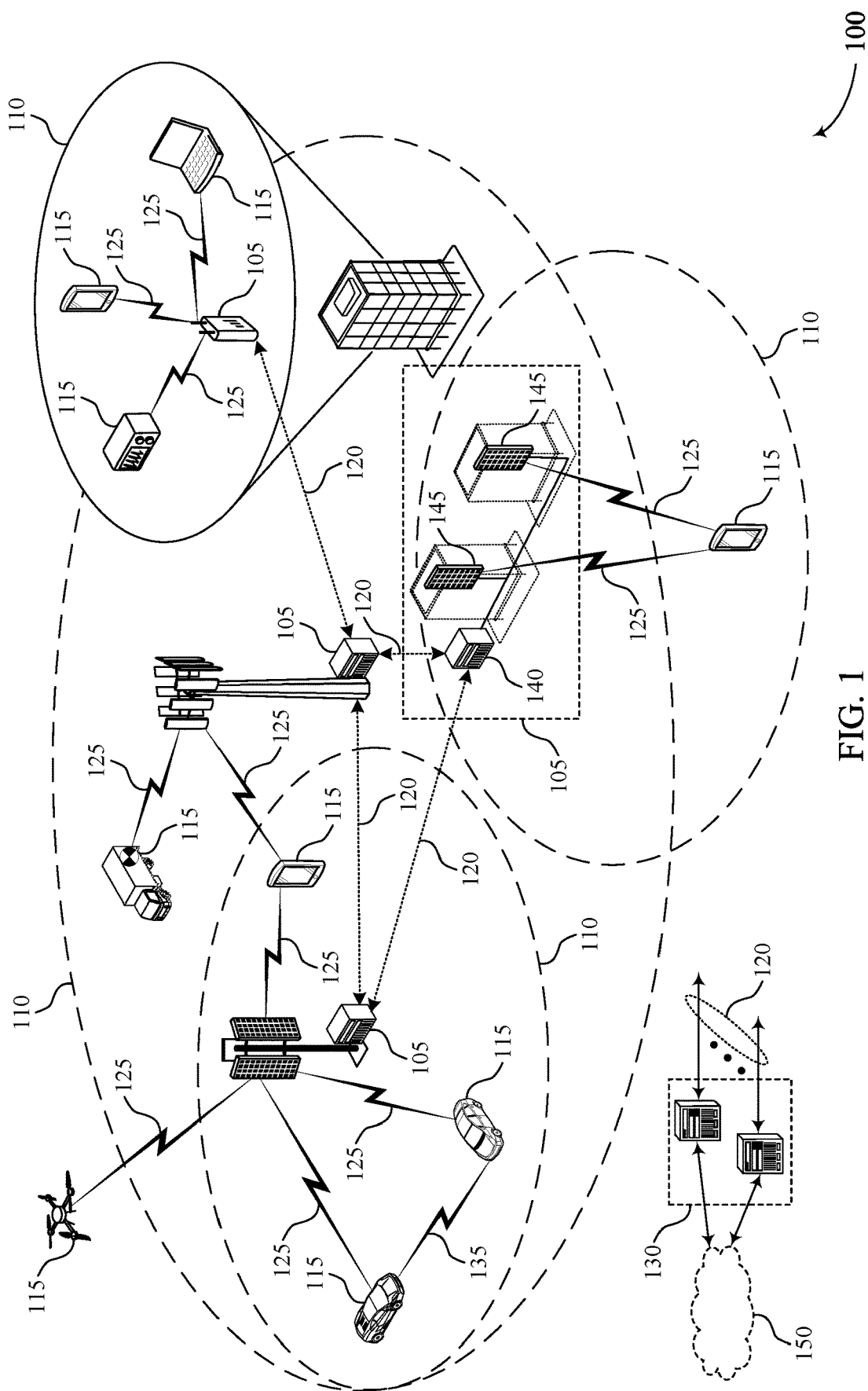
FIG. 1 illustrates an example of a wireless communications system that supports techniques for granting resources for network coding procedures in accordance with aspects of the present disclosure.

Some wireless communications systems may use network coding to increase system capacity and improve resource utilization in a network. Network coding, for example, may enable multiple transport blocks to be encoded into a single network coding packet for transmission. In some cases, network coding may be used by a roadside unit (RSU), a user equipment (UE), or other wireless node to facilitate efficient sidelink retransmissions. For example, UEs may transmit messages to multiple other UEs on a sidelink channel. If some messages are not received, a network coding device, such an RSU, may perform the retransmission instead of each transmitting UE individually sending the retransmissions. In some cases, the network coding device may send the retransmission with each unsuccessfully received packet and a network coding packet generated from the unsuccessfully received packets, such as by performing an exclusive or operation on the unsuccessfully received packets. The network coding device may enable for each receiving UE to receive the retransmissions, but the network coding device only reserves resources for a single transmission. Some wireless communications system may support a mode of sidelink communications where a base station assigns resource to wireless devices for sidelink communications (e.g., as opposed to autonomous resource selection by the wireless devices), which may be referred to as a first mode for sidelink communications or mode 1. Techniques for requesting and allocating resources for network coding signaling in a wireless communications system implementing mode 1 for sidelink communications have not been explored.

The present disclosure provides techniques to request and grant resources to transmit network coding messages on a sidelink. For example, a network coding device may transmit a request for resources for a network coding packet to a base station via a scheduling request, a buffer state report (BSR), a hybrid automatic repeat request (HARQ) feedback indication, or any combination thereof. In some cases, the network coding device may transmit a dedicated request message for resources for a network coding packet, or the request may be transmitted on a dedicated resource for the request. In some cases, the request message may include that the request is for resources for a network coding message, such as via a field of the request message, an identifier included in the request message, or a format of signaling carrying the request message.

The base station may transmit a grant signal to the network coding device in response to receiving the request. For example, the base station may send the grant via downlink control information, Radio Resource Control (RRC) signaling, or both. In some cases, the base station may indicate that the grant is to allocate resources for a network coding packet based on an identifier included in the grant, a field of the grant, or a format of signaling carrying the grant. The grant may be transmitted using unicast signaling or multicast signaling. For example, the grant may be unicast to the network coding device handling sidelink retransmission. Additionally, or alternatively, the base station may transmit multicast signaling including multiple grants for multiple network coding devices, where the resource for each network coding device is specified (e.g., by the grant or via other signaling).

The present disclosure provides techniques which are transparent to the base station and techniques which are non-transparent to the base station. Both transparent and non-transparent techniques may prevent the base station from granting resources to a transmitting UE for a retransmission if the retransmission is being handled by a network coding device. For non-transparent techniques, the base station may determine, or may be indicated, that a resource request message is for network coding signaling, and the base station may transmit a grant message to allocate resources for the network coding signaling. For example, the request message may be transmitted on dedicated resources associated with network coding packet transmission. The request message may include identifiers of transport blocks that are to be retransmitted by the network coding device via a network coding packet. The base station may refrain from granting resources to the original transmitting UEs for retransmission of the identifier transport blocks. For transparent techniques, a network coding device may indicate to a source UE that the network coding device is to handle retransmission for a packet from the source UE. The source UE may send an acknowledgment (ACK) to the base station, and the base station may refrain from granting resources to the source UE. The network coding device may request resources from the base station (e.g., without indicating that the request is for a network coding packet), such that the request and granting scheme is transparent to the base station.

Aspects of the disclosure are initially described in the context of wireless communications systems. Aspects of the disclosure are further illustrated by and described with reference to apparatus diagrams, system diagrams, and flowcharts that relate to techniques for granting resources for network coding procedures.

FIG. 1 illustrates an example of a wireless communications system 100 that supports techniques for granting resources for network coding procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSUs, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna array's or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 support network coding schemes to increase system capacity and improve resource utilization in a network. Network coding, for example, may enable multiple transport blocks to be encoded into a single network coding packet for transmission. Network coding schemes may increase system capacity and improve resource utilization. In some cases, network coding may be used by an RSU, a UE 115, a base station 105, or another wireless device to facilitate efficient sidelink retransmissions. For example, UEs 115 may transmit messages to multiple other UEs 115 on a sidelink channel. After the initial transmissions, retransmissions by the original transmitters or source UEs 115 may be replaced by a network coding device. For example, if some packets are not received, a network coding device, such an RSU, may perform the retransmission of the missed packets instead of each transmitting UE 115 individually retransmitting.

The network coding device may send a network coding packet, generated based on the unsuccessfully received packets. For example, the network coding device may generate a network coding packet based on performing an algebraic function or an algebraic algorithm on a set of transport blocks of the unsuccessfully received packets, such as an "exclusive or" operation. In some cases, the network coding packet may be generated using a single parity check code, which may correct one erasure. For example, the network coding device may identify a, b, and c as packets or messages to retransmit as or with a network coding packet. In some examples, the network coding device may generate a network coding packet by performing an "exclusive or" or "xor" operation on a, b, and c, generating the network coding packet a⊕b⊕c. Therefore, the network coding device may receive an input of [a, b, c], which is encoded to [a, b, c, a⊕b⊕c]. The network coding device may transmit the message with the network coding packet to UEs 115 or devices which did not successfully receive any one or more of the packets a, b, or c.

In some cases, single parity check codes may correct one erasure. For example, a destination UE 115 may receive the message with the network coding packet, but the destination UE 115 may receive the message with an erased element. For example, the destination UE 115 may receive a vector [a, ?, c, a⊕b⊕c], where the message b was erased. The destination UE 115 may recover the erased element by summing the other elements of the vector. For example, a⊕c⊕(a⊕b⊕c)=b. This may be an example of a linear system (e.g., over a Galois field) with three variables and four linearly independent constraints. Any three constraints (e.g., having one erasure or one element erased) may be sufficient to find the three variables, or to recover or correct an erasure.

The wireless communications system 100 may support sidelink communications according to a first sidelink mode, or mode 1. In mode 1, a base station 105 may coordinate resource allocations and schedule for wireless devices, such as RSUs and UEs 115. For other modes for sidelink communications, wireless devices may autonomously select resources for sidelink communications. In some cases, the wireless communications system 100 may also support these other modes for sidelink communications.

The wireless communications system 100 supports techniques described herein to request and grant resources to transmit network coding messages on a sidelink. For example, a network coding device, such as a UE 115 or an RSU, may transmit, to a base station 105, a request for resources to transmit a network coding message. The network via a scheduling request, a BSR, a HARQ feedback indication, or any combination thereof. In some cases, the network coding device may transmit a dedicated request message for resources to transmit the network coding message, or the request may be transmitted on a dedicated resource for the request. In some cases, the request message may include that the request is for resources for a network coding message, such as via a field of the request message, an identifier included in the request message, or a format of signaling carrying the request message.

The base station 105 may transmit a grant signal to the network coding device in response to receiving the request. For example, the base station may send the grant via downlink control information, RRC signaling, or both. In some cases, the base station 105 may indicate that the grant is to allocate resources for the network coding device to transmit a network coding message based on an identifier included in the grant, a field of the grant, or a format of signaling carrying the grant.

The wireless communications system 100 supports techniques which are transparent to the base station 105 and techniques which are non-transparent to the base station 105. Both transparent and non-transparent techniques may prevent the base station 105 from granting resources to a transmitting UE 115 for a retransmission if the retransmission is being handled by a network coding device. For non-transparent techniques, the base station 105 may determine, or may be indicated, that a resource request message is for network coding signaling, and the base station 105 may transmit a grant message to allocate resources for the network coding signaling. For example, the request message may be transmitted on dedicated resources associated with network coding packet transmission. The request message may include identifiers of transport blocks that are to be retransmitted by the network coding device via a network coding packet. The base station 105 may refrain from granting resources to the original transmitting UEs 115 for retransmission of the identifier transport blocks. For transparent techniques, a network coding device may indicate to a source UE 115 that the network coding device is to handle retransmission for a packet from the source UE 115. The source UE 115 may send an ACK to the base station 105, and the base station 105 may refrain from granting resources to the source UE 115. The network coding device may request resources from the base station (e.g., without indicating that the request is for a network coding packet), such that the request and granting scheme is transparent to the base station.

Figure 2:
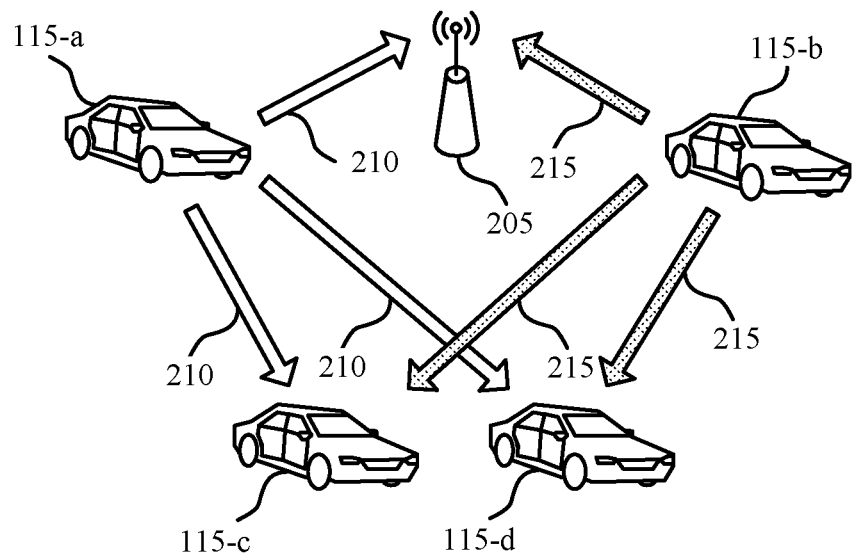
FIG. 2 illustrates an example of a wireless communications system that supports techniques for granting resources for network coding procedures in accordance with aspects of the present disclosure.
Figure 2:
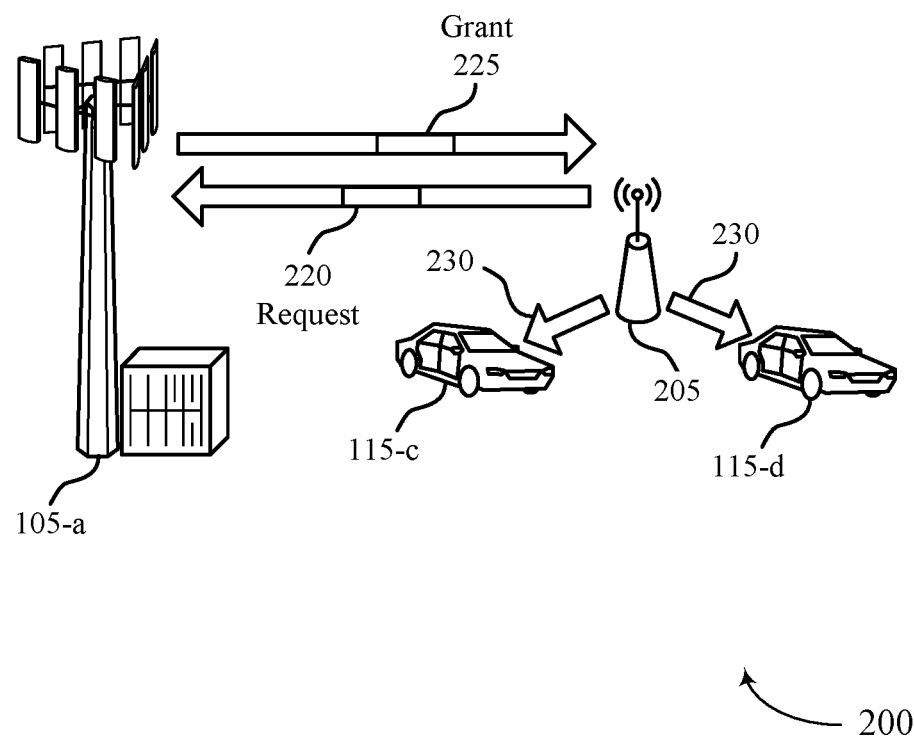

FIG. 2 illustrates an example of a wireless communications system 200 that supports techniques for granting resources for network coding procedures in accordance with aspects of the present disclosure. The wireless communications system 200 may include a base station 105-a and multiple UEs 115, which may be respective examples of a base station 105 and a UE 115 as described with reference to FIG. 1. The wireless communications system 200 may also include a network coding device, which may be an example of a wireless communications device, an RSU, a UE 115, a base station 105, or any combination thereof.

The wireless communications system 200 may support sidelink communications. For sidelink communications, a transmitting UE 115 may be referred to as a source UE 115, and a receiving UE 115 may be referred to as a destination UE 115. For example, a UE 115-a may transmit a first message 210 to several other UEs 115 or wireless devices. The UE 115-a may be an example of a source UE 115 with respect to the first message 210, and the receiving UEs 115 may be examples of destination UEs 115. For example, the UE 115-a may transmit a first message 210 to a UE 115-c, a UE 115-d, the RSU 205, or any combination thereof. Similarly, a UE 115-b may transmit a second message 215 to the UE 115-d, the UE 115-d, the RSU 205, or any combination thereof.

In some cases, resource allocation and selection for sidelink communications in the wireless communications system 200 may be managed by a base station 105, such as the base station 105-a. For example, the base station 105-a may transmit grant signaling to the UEs 115 and the RSU 205 to allocate resources for communications on a sidelink. In some cases, this scheme may be referred to as Mode 1 for sidelink communications.

The wireless communications system 200 may support techniques to request and grant resources to transmit network coding messages on a sidelink. For example, the RSU 205 may handle retransmission for packets transmitted on the sidelink by transmitting a network coding message with a network coding packet. The network coding packet may be generated based on multiple transport blocks or messages which were not received by destination UEs 115. The RSU 205 may perform the retransmission of the multiple transport blocks via a network coding message with the network coding packet to reduce a number of retransmissions in the wireless communications system 200, improving resource utilization efficiency and decreasing a total amount of signaling to perform the retransmissions. To be granted resources to transmit the network coding message, the RSU 205 may transmit a request 220 for the resources to the base station 105-a. The base station 105-a may transmit a grant 225 to the RSU 205, allocating resources to transmit a network coding message 230.

In an example, the UE 115-a may transmit the first message 210 to at least the UE 115-c and the UE 115-d on a sidelink. In some cases, the UE 115-a may also transmit the first message 210 to the RSU 205 on the sidelink, or the RSU 205 may receive the first message 210 in separate signaling. The UE 115-c may receive the first message 210, but the UE 115-d may not receive the first message 210, such as due to a transmission or decoding failure. Similarly, the UE 115-b may transmit the second message 215 to the UE 115-c and the UE 115-d. The UE 115-c may receive the second message 215, but the UE 115-d may not receive the second message 215 or may have an error decoding the second message 215. Therefore, the UE 115-c may not have received the first message 210, and the UE 115-d may not have received the second message 215. In some examples, the UE 115-*c* may report a negative acknowledgment (NACK) for the first message 210, and the UE 115-*d* may report a NACK for the second message 215.

In some cases, the RSU 205 may handle retransmissions for UEs 115 by sending a network coding message with a network coding packet. For example, instead of the UE 115-*a* retransmitting the first message 210 to the UE 115-*d* and the UE 115-*b* retransmitting the second message 215 to the UE 115-*c*, the RSU 205 may perform the retransmission of both the first message 210 and the second message 215 in a single transmission. This may reduce the amount of resources used to retransmit the first message 210 and the second message 215 and improve retransmission coordination for the devices.

In some cases, the RSU 205 may receive the first message 210 from the UE 115-*a* and receive the second message 215 from the UE 115-*b*. In some examples, the RSU 205 may determine that the UE 115-*d* did not receive the first message 210 based on a HARQ feedback message transmitted by the UE 115-*d*, indicating a NACK for the first message 210. Similarly, the RSU 205 may detect a NACK from the UE 115-*c* for the second message 215. In some other examples, the UE 115-*a* or the UE 115-*b*, or both, may request for the RSU 205 to perform retransmission for the first message 210 or the second message 215, or both. In some cases, the RSU 205 may indicate that the RSU 205 is handling retransmission for the first message 210 and the second message 215 to the UE 115-*a* and the UE 115-*b*.

The RSU 205 may transmit, to the base station 105-*a*, the request 220 for resources to transmit a network coding message 230 that includes a network coding packet. The request 220 may include, or be an example of, a scheduling request, a BSR, HARQ feedback, or any combination thereof.

For example, the RSU 205 may transmit a scheduling request as the request 220. In some cases, the scheduling request may be used to indicate that the request 220 is for resources to transmit a network coding message 230. In some examples, a scheduling request for resources to transmit a network coding message 230 may be differentiated from a scheduling request for resources to transmit a non-network coding message. By indicating that the scheduling request is for resources to transmit a network coding message 230, the base station 105-*a* may indicate that the granted resources are to be used to transmit the network coding message 230, or an amount of resources granted may be based a size of the network coding message 230. In some cases, a scheduling request which is transmitted to request resources for a network coding message 230 may be referred to as a network coding scheduling request In some cases, a network coding scheduling request may include a sequence associated with network coding packet transmission. For example, the network coding scheduling request may use a unique orthogonal sequence in uplink control channel resources. The orthogonal sequence may be low peak to average power (PAPR) sequence. In some cases, different network coding devices (e.g., different RSUs) may be assigned with different sequences. The sequences for different network coding devices may be signaled by a serving base station, such as the base station 105-*a*, or may be preconfigured at the network coding devices.

In some cases, a network coding scheduling request may use a group identifier associated with network coding packet transmission. For example, the network coding scheduling request may use a group identifier which is unique to network coding scheduling requests. In some cases, the group identifier may not be used for a scheduling request unless the scheduling request is associated with or for network coding packet transmission.

In some examples, a scheduling request may be transmitted on reserved or dedicated resources. For example, a network coding scheduling request may be transmitted on resources which are reserved for a network coding-type of scheduling request. Additionally, or alternatively, a scheduling request may be identified or distinguished as a network coding scheduling request based on being transmitted on the reserved or dedicated resources. In some cases, the resources for the network coding scheduling request may be assigned by the base station 105-*a*, such as via RRC signaling, or the resources may be pre-configured. In some cases, the RSU 205 may indicate, to the base station 105-*a*, a capability to support network coding transmission, and the base station 105-*a* may assign the RSU 205 with dedicated or reserved resources to transmit a network coding scheduling request in response. In some cases, different RSUs may be assigned with different network coding scheduling request resources, or multiple RSUs may be configured to share a network coding scheduling request resource.

In some cases, the RSU 205 may transmit a network coding scheduling request periodically. Additionally, or alternatively, the RSU 205 may transmit the network coding scheduling request based on a trigger or event detection. For example, the RSU 205 may detect negative feedback for multiple transport blocks transmitted in the wireless communications system 200, and the RSU 205 may determine to perform a network coding retransmission for the multiple transport blocks. In some cases, the network coding scheduling request may be multiplexed with other signaling, such as CSI reporting. The network coding scheduling request may be transmitted using PUCCH format 0, 1, 2, 3, or 4.

In some cases, the RSU 205 may transmit a BSR as the request 220. In some cases, the BSR may be used to indicate that the request 220 is for the RSU 205 to transmit a network coding message 230 including a network coding packet. In some cases, a BSR transmitted to request resources for a network coding message 230 may be distinguished or different from a BSR transmitted to request resources for a non-network coding message. In some cases, one or more bits in the BSR may indicate that the BSR is associated with network coding packet transmission. In some cases, a bit in the BSR may be used such that the requested resources may be for periodic transmission, where the period may be indicated in the BSR. In some examples, the RSU 205 may report a number of transport blocks for the network coding message 230 or a network coding packet length or size via the BSR. The base station 105-*a* may grant resources for the network coding message 230 based on the BSR indicating the number of transport blocks or network coding message size. The BSR may be transmitted periodically or based on a trigger, such as a trigger detected by the RSU 205. A BSR associated with network coding packet transmission may have a short BSR format or a long BSR format.

In some cases, the RSU 205 may transmit HARQ feedback as the request 220. For example, to request resources used for retransmissions of one or more packets or messages, the RSU 205 may transmit NACK feedback to the base station 105-*a* for the one or more packets to request retransmission resources for the one or more packets or messages. In some cases, the request 220 may include a unique identifier associated with network coding transmission or retransmission. When the base station 105-*a* receives the request 220 with the unique identifier, the base station 105-*a* may select resources for the transmission or retransmission from a preconfigured or corresponding set of resource assignments. For example, the base station 105-*a* may identify that the NACK is to request resources for retransmission, and the time and amount of resources for the retransmission may be computed in a preconfigured way. In some cases, the unique identifier may be linked to a packet identifier. For example, the unique identifier may be linked to a packet identifier of a packet associated with the HARQ feedback. In some cases, downlink control information resource grant signaling may include one or more bits reserved to initialize HARQ feedback-based requests.

In some cases, the RSU 205 may transmit an ACK if network coding-based retransmissions is not used. For example, the RSU 205 may transmit an ACK to the base station 105-*a* if all transport blocks are decoded successfully for all recipients. Additionally, or alternatively, the RSU 205 may transmit an ACK to the base station 105-*a* if a number of failed transport blocks is below a threshold. Additionally, or alternatively, the RSU 205 may transmit an ACK to the base station 105-*a* if a number of failed decodings is below a threshold. Additionally, or alternatively, the RSU 205 may transmit an ACK to the base station 105-*a* if a failed transport block has been retransmitted for a threshold number of times. Otherwise, the RSU 205 may transmit a NACK to request resources for a network coding-based retransmission.

In some cases, the RSU 205 may transmit the request 220 on dedicated resources. For example, the RSU 205 may be configured with dedicated uplink shared channel resources or dedicated uplink control channel resources for the RSU 205 to transmit the request 220.

In some examples, the request 220 may include identifiers for transport blocks encoded into the network coding packet. For example, the request 220 may include a source UE identifier for each transport block in the network coding packet or a packet identifier for each transport block in the network coding packet, or both. For example, the request 220 may include an identifier for UE 115-*a* as the source UE 115 for the first message 210, and the request 220 may include a packet identifier for the first message 210. The request 220 may also include an identifier for UE 115-*b* as the source UE 115 for the second message 215, and the request 220 may include a packet identifier for the second message 215.

In some cases, the request 220 may include additional identifier for transport blocks the RSU 205 is to transmit in a later network coding message in a later slot. For example, the request 220 may include source UE identifiers and transport block identifiers for transport blocks that the RSU 205 may use to generate a second network coding packet, the second network coding packet to be transmitted in a later slot or resource.

In some cases, the RSU 205 may transmit the request 220 periodically. A configuration for periodically transmitting the request 220, such as a periodicity or a resource allocation, may be configured at the RSU 205 via RRC signaling, downlink control information, or a MAC CE. In some examples, the RSU 205 may transmit the request 220 after being signaled by the base station 105-*a*. For example, the base station 105-*a* may enable or trigger the RSU 205 to transmit the request 220.

In some examples, the base station 105-*a* may compute the network coding packet. For example, the base station 105-*a* may compute the network coding packet based on information from the request 220, information received from other encoders or wireless devices (e.g., the source UEs 115 or destination UEs 115, or both), and information stored at the base station 105-*a*. In some cases, the base station 105-*a* may send the network coding packet with a grant 225 to the RSU 205. In some other examples, the RSU 205 may determine or calculate the network coding packet.

In some cases, the RSU 205 may transmit the request 220 to request a certain amount of resources for the network coding message 230. In some cases, the RSU 205 may request an amount of resources based on a specific network coding situation. For example, the RSU 205 may request an amount of resources for retransmission of any unsuccessfully received packets as well as a network coding packet. For example, the RSU 205 may request an amount of resources based on a size of the first message 210, a size of the second message 215, and a size of a network coding packet generated based on the first message 210 and the second message 215. In some cases, the RSU 205 may request a default amount of resources. For example, the request 220 may not specify an amount of resources, as the base station 105-*a* may allocate a default or preconfigured amount of resources for network coding messages. This may reduce an overhead for the request 220 and processing power at the RSU 205.

In some cases, based on receiving the request 220, the base station 105-*a* may refrain from granting resources to the original transmitting UEs 115 (e.g., the source UE 115) for retransmission of the transport blocks. For example, the base station 105-*a* may determine that retransmission of the indicated transport blocks is being handled by the RSU 205, and the base station 105-*a* may refrain from allocating resources for retransmitting the transport blocks to the source UEs 115. In some wireless communications systems, a NACK by a transmitting UE 115 may trigger a resource grant for retransmission. However, by receiving the request 220, the base station 105-*a* may ignore the NACK from the transmitting UE 115, or the base station 105-*a* may refrain from triggering the resource grant for retransmission.

The base station 105-*a* may transmit a grant 225 to the RSU 205, allocating resources for the network coding message 230 to the RSU 205. In some cases, the base station 105-*a* may transmit the grant 225 after receiving the request 220 from the RSU 205. The grant 225 may be transmitted via downlink control information or RRC signaling, or both. The grant 225 may indicate frequency and time resources for transmission as well as a transmission period for the RSU 205 to transmit the network coding message 230.

In some cases, the grant 225 may be transmitted via downlink control information with a format specific to granting resources for a network coding message. In some examples, the grant 225 may be transmitted via RRC signaling, such as an RRC configuration message. In some cases, the grant 225 may include a list of transport blocks to encode and a list of destination UE identifiers. For example, the grant 225 may include fields to indicate the list of transport blocks and the list of destination UE identifiers if the grant 225 is transmitted using a dedicated downlink control information format or an RRC configuration message.

In some cases, the grant 225 may indicate whether the granted resources are for a message including a network coding packet or for regular, non-network coding data. For example, an identifier (e.g., an RNTI) of the grant 225, a field in the grant 225, or a format of signaling used to transmit the grant 225, or any combination thereof, may indicate whether the granted resources are for network coding packet transmission or non-network coding messages. For example, the grant 225 may be transmitted via downlink control information with a format that is associated with network coding packet transmission, and the format of the downlink control information may implicitly indicate that the granted resources are for network coding packet transmission.

In some cases, a source UE 115 may decode the grant 225. For example, the UE 115-*a* may receive the grant 225 and determine that the RSU 205 is handling retransmission for the first message 210. In some cases, the source UE 115 may decode the grant 225 based on an RNTI associated with granting resources for network coding packet transmission. In some cases, UEs 115 and network coding devices, such as RSUs 205, may use a same RNTI to decode the grant 225.

The grant 225 may be transmitted using unicast signaling, groupcast signaling, multicast signaling, or any combination thereof. For example, the grant 225 may be unicast to each RSU 205. In some examples, signaling for the grant 225 may include multiple grants to multiple network coding devices, and the signaling may specify granted resources for each network coding device. In some cases, the grant 225 may grant resources for multiple network coding devices, where the granted resources are shared by the multiple network coding devices.

The network coding packet for the network coding message 230 may be generated based on, for example, the first message 210 and the second message 215, or based on transport blocks of the first message 210 and the second message 215. In some cases, the base station 105-*a* may send the network coding packet to the RSU 205. In some other examples, the RSU 205 may determine or calculate the network coding packet. The RSU 205 may transmit the network coding message 230 including the network coding packet to the destination UEs 115. For example, the RSU 205 may transmit the network coding message 230 to the UE 115-*c* and the UE 115-*d*. The UE 115-*c* may receive the network coding message 230 and receive or recover the first message 210 based on the network coding message 230. The UE 115-*d* may receive the network coding message 230 and receive or recover the second message 215 based on the network coding message 230.

The wireless communications system 200 may support techniques for a transparent design and a non-transparent design to request and grant resources for transmitting a network coding packet. For a non-transparent design, the base station 105-*a* may be aware that the request 220 is for resources to transmit a network coding message including a network coding packet. For a transparent design, the base station 105-*a* may not be aware that the request 220 is for resources (e.g., specifically) to transmit a network coding message. For a non-transparent design, the base station 105-*a* may refrain from allocating resources to the source UEs 115 for retransmission based on identifying that the network coding device (e.g., the RSU 205) is handling the retransmission. However, for a transparent design, the base station 105-*a* may not be aware that the RSU 205 is handling the retransmission.

The wireless communications system 200 may implement techniques to prevent the base station 105-*a* from granting resources for a retransmission to the source UEs 115 in a transparent design as well. For example, after a source UE 115 or a transmitting UE 115 determines that the RSU 205 is handling the retransmission, the source UE 115 may transmit an ACK to the base station 105-*a*, even though initial transmission to the destination UE 115 was unsuccessful. This may prevent the base station 105-*a* from granting resources to the source UE 115 for retransmission. Another example of a transparent design scheme is described in more detail with reference to FIG. 4.

Figure 3:
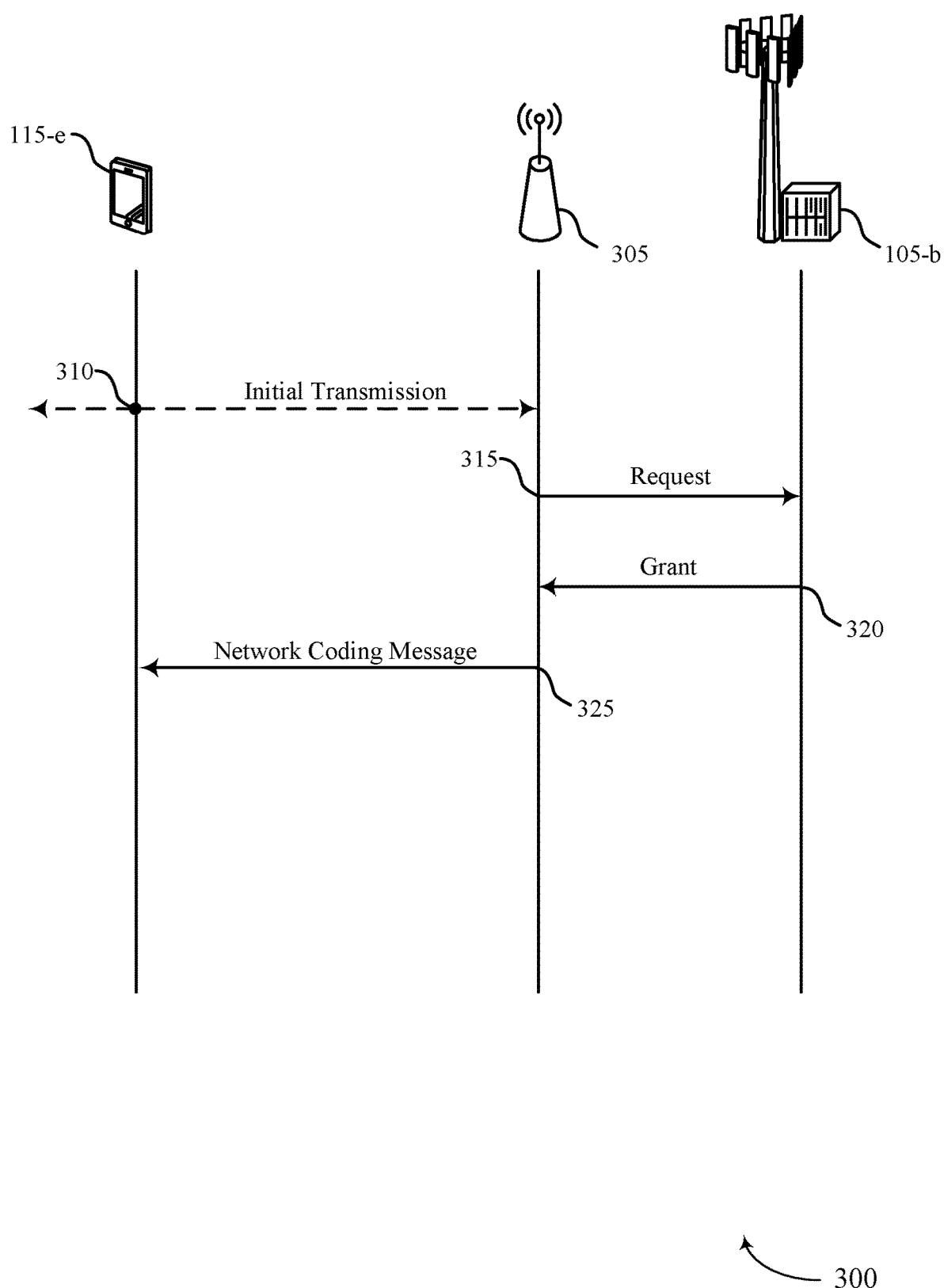
FIG. 3 illustrates an example of a non-transparent scheme that supports techniques for granting resources for network coding procedures in accordance with aspects of the present disclosure.

FIG. 3 illustrates an example of a non-transparent scheme 300 that supports techniques for granting resources for network coding procedures in accordance with aspects of the present disclosure. The non-transparent scheme 300 may be implemented by a UE 115-*e*, an RSU 305, a base station 105-*b*, or any combination thereof. The UE 115-*e* may be an example of a UE 115, such as a source UE 115, as described with reference to FIGS. 1 and 2. The RSU 305 may be a wireless communications device which supports network coding and network coding packet transmission, which may be referred to as a network coding device. The base station 105-*b* may be an example of a base station 105 as described with reference to FIGS. 1 and 2. In some cases, the base station 105-*b* may manage resource allocations for sidelink communications, such as operating according to Mode 1 for sidelink communications.

For the non-transparent scheme 300, the base station 105-*b* may be aware that the RSU 305 performs a retransmission for the UE 115-*e* by transmitting a network coding message. For example, at 310, the UE 115-*e* may perform an initial transmission of a packet. One or more receiving UEs 115, or destination UEs 115, may not receive or may incorrectly decode the packet from the initial transmission. In some cases, a second source UE 115 may transmit a sidelink transmission including at least a second packet, and the second packet may not be received by at least one or more destination UEs 115. Instead of the UE 115-*e* and the second source UE 115 separately performing retransmissions for the packets, the RSU 305 may perform the retransmission of the first packet and the second packet, generating a network coding packet based on the first packet and the second packet.

At 315, the RSU 305 may transmit, to the base station 105-*b*, a request for resources to transmit a network coding message that includes a network coding packet. The network coding packet may be representative of a set of transport blocks that are coded together. The request may be for resources to transmit the network coding message to a set of multiple UEs 115, such as destination UEs 115 which have reported a NACK for at least one transport block of the set of transport blocks. In some cases, the network coding message may include the set of transport blocks and the network coding packet, where the RSU 305 retransmits each of the transport blocks and includes a network coding packet, generated based on performing an operation on the set of transport blocks, such as performing an "exclusive or" operation on the set of transport blocks. In some other examples, the RSU 305 may perform additional, or alternative, operations on the set of transport blocks to generate the network coding packet, such as other algebraic operations or algebraic algorithms. In some examples, by performing the operation on the set of transport blocks, the set of transport blocks may be coded together to generate the network coding packet.

The request may include identifiers associated with the transport blocks of the network coding packet. For example, the request message may include a source identifier for each transport block and a packet identifier for each transport block. The group of transport blocks may correspond to transport blocks the RSU 305 has newly determined to retransmit, or the group of transport blocks may correspond to all transport blocks whose retransmission is handled by the RSU 305. In some cases, the request message may request an amount of resources based on an initial transmission of the transport blocks or a network coding packet generated based on the transport blocks, or both.

In some cases, the request may specify that the request is for resources to transmit a network coding message including a network coding packet. For example, the request may include a field or identifier which indicates that the request is associated with network coding packet transmission, or the request may be configured according to format which is associated with network coding packet transmission. Additionally, or alternatively, the request may be transmitted on dedicated or reserved resources for transmitting requests associated with network coding packet transmission. As described with reference to FIG. 2, the request may be a scheduling request, a BSR, HARQ feedback, or any combination thereof.

Based on receiving the request, the base station 105-*b* may stop granting resources to the source UEs 115 for retransmission of the transport blocks. For example, the base station 105-*b* may determine that retransmission of the transport blocks is being performed by the RSU 305 based on receiving the request.

At 320, the base station 105-*b* may transmit a grant allocating a set of resources for network coding packet transmission to the RSU 305. The grant may be transmitted via downlink control information or RRC signaling. For example, the grant may be transmitted via downlink control information or an RRC configuration message with a format associated with network coding packet transmission. The grant may indicate frequency and time resources for the allocated set of resources. In some cases, the set of resources may be periodic, and the grant may indicate a periodicity for the set of resources. In some cases, the grant may indicate a list of transport blocks to encode and a list of destination UE identifiers. In some cases, the grant may indicate that the allocated set of resources are for a network coding packet or for a regular (e.g., non-network coding) data transmission. For example, an RNTI, field, or format of the grant may indicate whether the granted resources are for transmitting a network coding packet. In some examples, the UE 115-*f* may also decode the grant. The UE 115-*f* may determine that the RSU 305 is performing the retransmission for the packet based on receiving the grant. At 325, the RSU 305 may transmit the network coding message to the set of multiple UEs 115 (e.g., destination UEs 115) on the set of resources in accordance with the grant.

Figure 4:
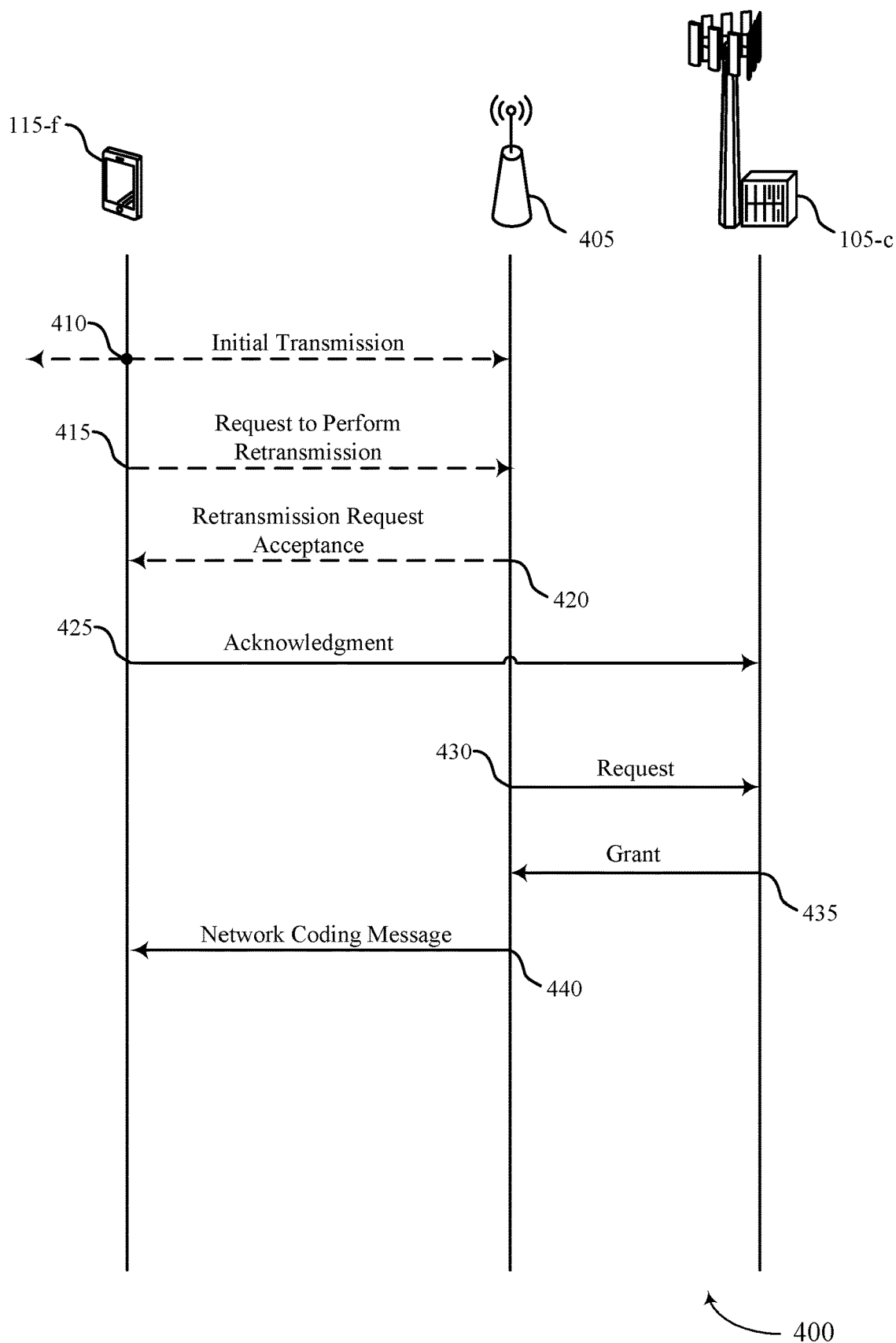
FIG. 4 illustrates an example of a transparent scheme that supports techniques for granting resources for network coding procedures in accordance with aspects of the present disclosure.

FIG. 4 illustrates an example of a transparent scheme 400 that supports techniques for granting resources for network coding procedures in accordance with aspects of the present disclosure. The transparent scheme 400 may be implemented by a UE 115-*f*, an RSU 405, a base station 105-*c*, or any combination thereof. The UE 115-*f* may be an example of a UE 115, such as a source UE 115, as described with reference to FIGS. 1 and 2. The RSU 405 may be a wireless communications device which supports network coding and network coding packet transmission, which may be referred to as a network coding device. The base station 105-*c* may be an example of a base station 105 as described with reference to FIGS. 1 and 2. In some cases, the base station 105-*c* may manage resource allocations for sidelink communications, such as operating according to Mode 1 for sidelink communications.

For the transparent scheme 400, the base station 105-*c* may not be aware that the RSU 405 performs a retransmission for source UEs 115, such as the UE 115-*f*, by transmitting a network coding message. For example, at 410, the UE 115-*f* may perform an initial transmission of a packet. One or more receiving UEs 115, or destination UEs 115, may not receive or may incorrectly decode the packet from the initial transmission. In some cases, a second source UE 115 may transmit a sidelink transmission including at least a second packet, and the second packet may not be received by at least one or more destination UEs 115. Instead of the UE 115-*f* and the second source UE 115 separately performing retransmissions for the packets, the RSU 405 may perform the retransmission of the first packet and the second packet, generating a network coding packet based on the first packet and the second packet.

In some cases, at 415, the UE 115-*f* may request for the RSU 405 to perform retransmission of the packet via a network coding message including a network coding packet. The RSU 405 may determine whether to accept the request from the UE 115-*f* (e.g., the source UE 115) based on a distance between the UE 115-*f* and the RSU 405, a priority of the original transmission by the UE 115-*f*, system congestion or system load, a number of retransmissions being handled by the RSU 405, or any combination thereof. If the RSU 405 accepts the request, the RSU 405 may transmit an indication to the UE 115-*f* at 420 that the RSU 405 has accepted the request.

After determining that the RSU 405 is to perform the retransmission, the UE 115-*f* may transmit an ACK to the base station 105-*c* at 425. In some wireless communications systems, a NACK from a source UE 115 may trigger a resource grant for retransmission. By transmitting the ACK at 425, the base station 105-*c* may refrain from granting resources to the UE 115-*f* for retransmission. For example, if the UE 115-*f* initially reports a NACK for a packet, determines that the RSU 405 is handling retransmission for the packet, and then reports an ACK for the packet, the base station 105-*c* may ignore the NACK from the UE 115-*f* and refrain from granting resources to the UE 115-*f* to retransmit the packet.

At 430, the RSU 405 may transmit, to the base station 105-*c*, a request for resources. The request may be for the RSU 405 to transmit a network coding message that includes a network coding packet. However, in some cases for the transparent scheme 400, the request may not specifically indicate that the request is associated with network coding packet transmission. For example, the RSU 405 may request an amount of resources to transmit the network coding message, but the RSU 405 may not include an explicit indicator that the resources are for the network coding message. In some other examples, the RSU 405 may include some indicators, fields, or use formats associated with network coding packet transmission, as described with reference to the non-transparent scheme 300 described with reference to FIG. 3. As described with reference to FIG. 2, the request may be a scheduling request, a BSR, HARQ feedback, or any combination thereof.

At 435, the base station 105-*c* may transmit a grant allocating a set of resources for network coding packet transmission to the RSU 405. At 440, the RSU 405 may transmit the network coding message to the set of multiple UEs 115 (e.g., destination UEs 115) on the set of resources in accordance with the grant.

Figure 5:
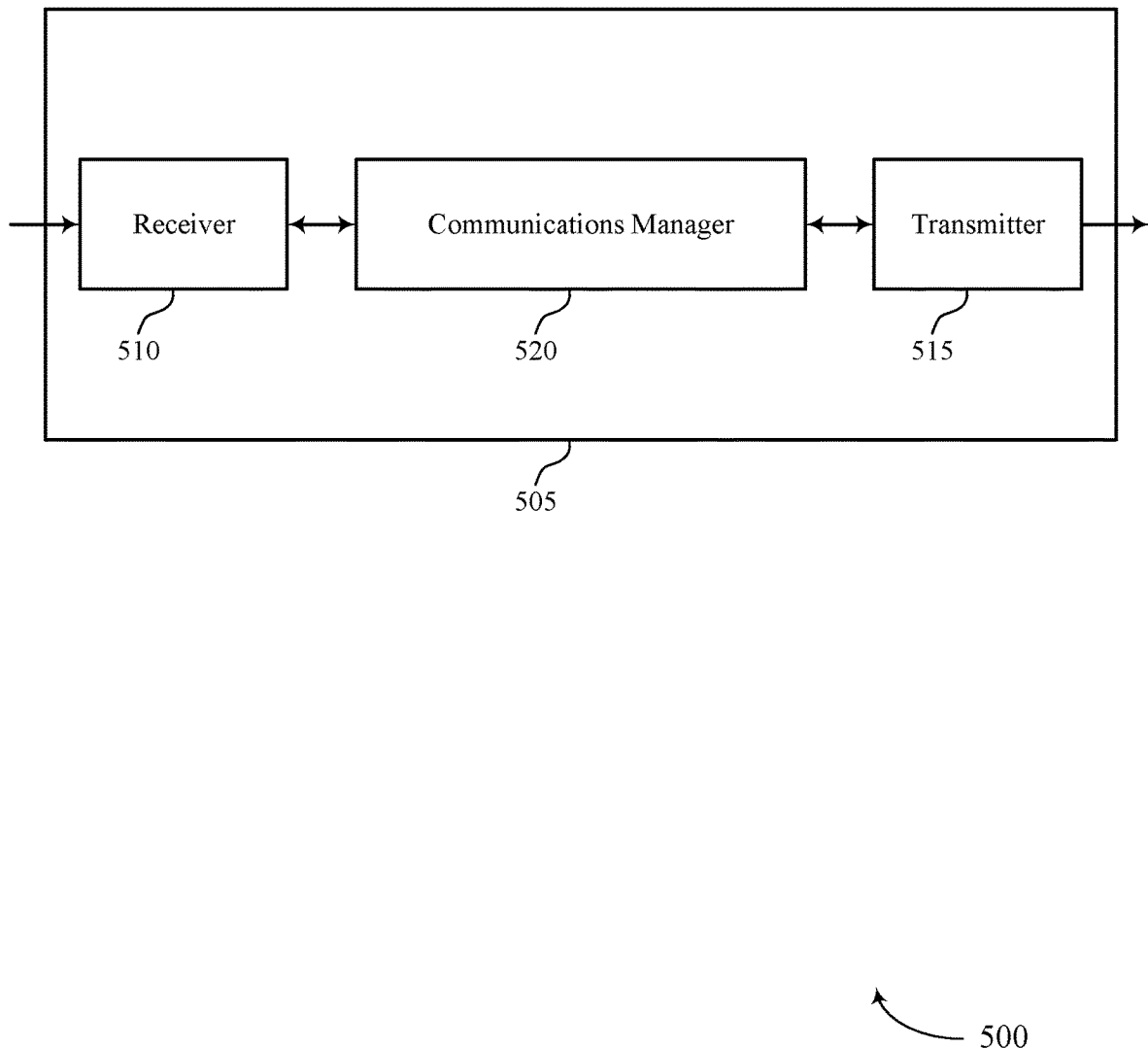
FIGS. 5 and 6 show block diagrams of devices that support techniques for granting resources for network coding procedures in accordance with aspects of the present disclosure.

FIG. 5 shows a block diagram 500 of a device 505 that supports techniques for granting resources for network coding procedures in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for granting resources for network coding procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for granting resources for network coding procedures). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for granting resources for network coding procedures as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless communications device in accordance with examples as disclosed herein. For example, the communications manager 520 may be configured as or otherwise support a means for transmitting, to a base station, a request for resources to transmit, by the wireless communications device and to a set of multiple UEs, a network coding message that includes a network coding packet that is representative of a set of transport blocks that are coded together. The communications manager 520 may be configured as or otherwise support a means for receiving, from the base station and responsive to the request, a grant allocating a set of resources for network coding packet transmission. The communications manager 520 may be configured as or otherwise support a means for transmitting the network coding message to the set of multiple UEs on the set of resources in accordance with the grant.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources by reducing a number of retransmissions in the system while maintaining retransmission efficiency.

Figure 6:
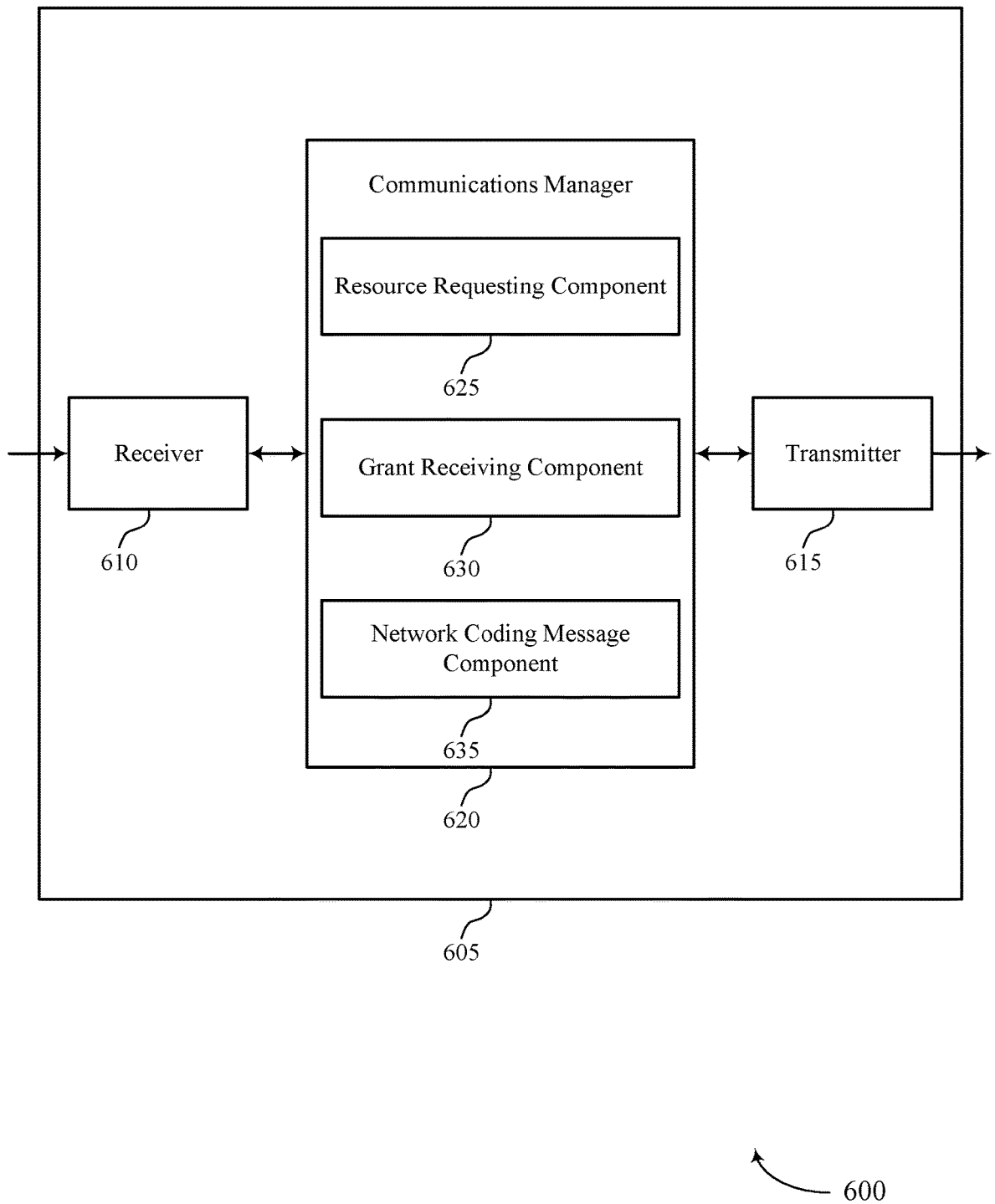

FIG. 6 shows a block diagram 600 of a device 605 that supports techniques for granting resources for network coding procedures in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for granting resources for network coding procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for granting resources for network coding procedures). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for granting resources for network coding procedures as described herein. For example, the communications manager 620 may include a resource requesting component 625, a grant receiving component 630, a network coding message component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a wireless communications device in accordance with examples as disclosed herein. The resource requesting component 625 may be configured as or otherwise support a means for transmitting, to a base station, a request for resources to transmit, by the wireless communications device and to a set of multiple UEs, a network coding message that includes a network coding packet that is representative of a set of transport blocks that are coded together. The grant receiving component 630 may be configured as or otherwise support a means for receiving, from the base station and responsive to the request, a grant allocating a set of resources for network coding packet transmission. The network coding message component 635 may be configured as or otherwise support a means for transmitting the network coding message to the set of multiple UEs on the set of resources in accordance with the grant.

Figure 7:
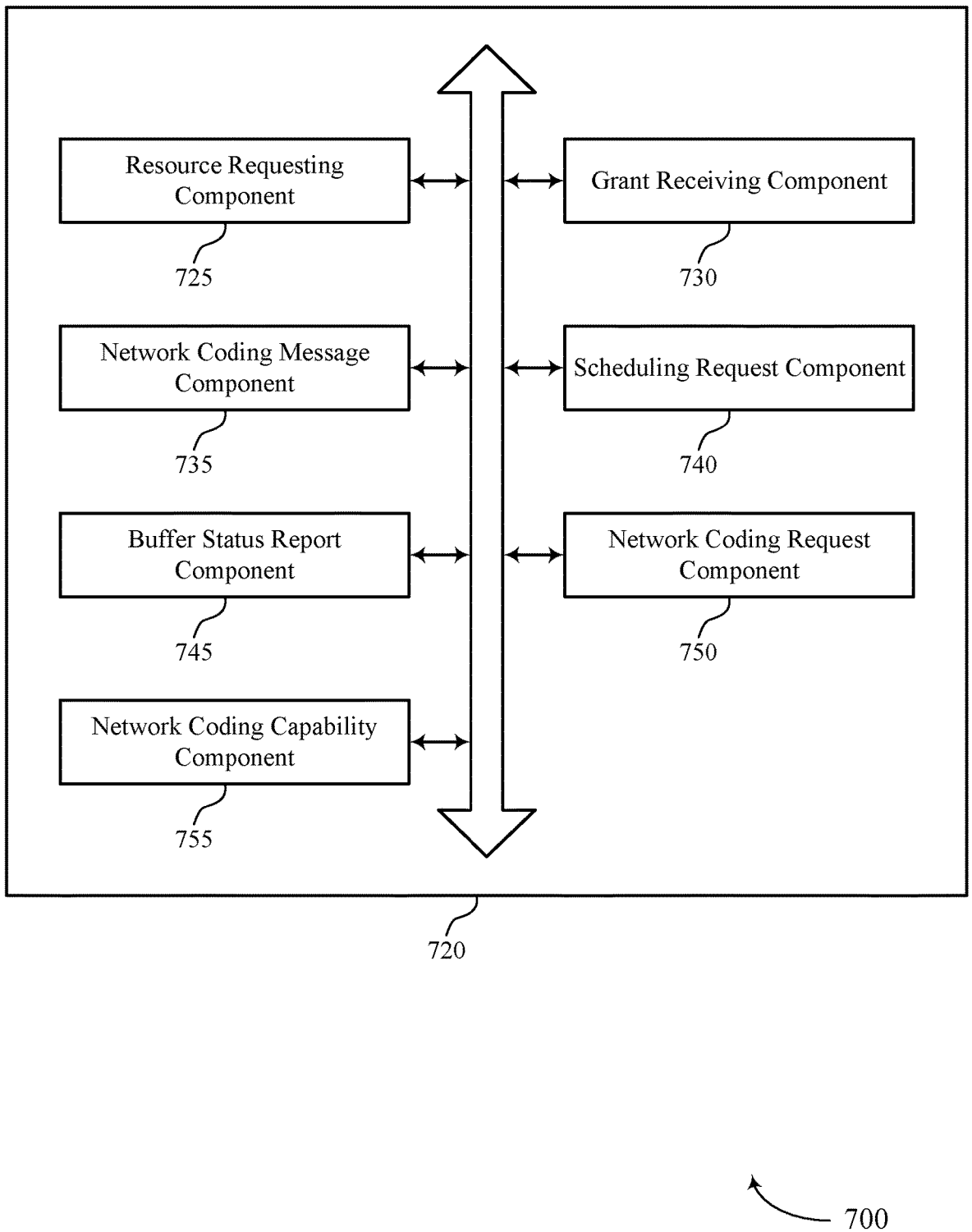
FIG. 7 shows a block diagram of a communications manager that supports techniques for granting resources for network coding procedures in accordance with aspects of the present disclosure.

FIG. 7 shows a block diagram 700 of a communications manager 720 that supports techniques for granting resources for network coding procedures in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for granting resources for network coding procedures as described herein. For example, the communications manager 720 may include a resource requesting component 725, a grant receiving component 730, a network coding message component 735, a scheduling request component 740, a buffer status report component 745, a network coding request component 750, a network coding capability component 755, or any combination thereof. Each of these components may communicate, directly or indirectly, with one another (e.g., via one or more buses).

The communications manager 720 may support wireless communications at a wireless communications device in accordance with examples as disclosed herein. The resource requesting component 725 may be configured as or otherwise support a means for transmitting, to a base station, a request for resources to transmit, by the wireless communications device and to a set of multiple UEs, a network coding message that includes a network coding packet that is representative of a set of transport blocks that are coded together. The grant receiving component 730 may be configured as or otherwise support a means for receiving, from the base station and responsive to the request, a grant allocating a set of resources for network coding packet transmission. The network coding message component 735 may be configured as or otherwise support a means for transmitting the network coding message to the set of multiple UEs on the set of resources in accordance with the grant.

In some examples, to support transmitting the request, the scheduling request component 740 may be configured as or otherwise support a means for transmitting a scheduling request associated with network coding packet transmission.

In some examples, to support transmitting the scheduling request, the scheduling request component 740 may be configured as or otherwise support a means for transmitting, as the scheduling request, a sequence associated with network coding packet transmission. In some examples, the sequence is an orthogonal sequence unique to the wireless communications device.

In some examples, the scheduling request component 740 may be configured as or otherwise support a means for receiving, from the base station and prior to transmission of the scheduling request, an indication of the sequence, where the sequence is associated with the wireless communications device based on the indication.

In some examples, the scheduling request is transmitted using a group identifier associated with network coding packet transmission. In some examples, the scheduling request is transmitted on a resource associated with network coding packet transmission.

In some examples, the network coding capability component 755 may be configured as or otherwise support a means for transmitting, to the base station, an indication that the wireless communications device is capable of network coding packet transmission. In some examples, the network coding capability component 755 may be configured as or otherwise support a means for receiving, in response to the indication, control signaling from the base station configuring the resource associated with network coding packet transmission.

In some examples, the resource associated with network coding packet transmission is unique to the wireless communications device or is configured for a group of wireless communications devices including the wireless communications device.

In some examples, to support transmitting the request, the buffer status report component 745 may be configured as or otherwise support a means for transmitting a buffer status report associated with network coding packet transmission.

In some examples, a bit in the buffer status report indicates that the buffer status report is associated with network coding packet transmission.

In some examples, to support transmitting the request, the resource requesting component 725 may be configured as or otherwise support a means for transmitting NACK feedback associated with a set of multiple packets for the set of multiple UEs.

In some examples, the NACK feedback includes an identifier associated with network coding packet transmission. In some examples, the identifier is associated with a packet identifier of the network coding packet.

In some examples, the grant receiving component 730 may be configured as or otherwise support a means for receiving control signaling from the base station configuring a dedicated resource for the request that is associated with network coding packet transmission, where the request is transmitted on the dedicated resource.

In some examples, the request includes one or more source identifiers of the set of transport blocks to be encoded in the network coding packet and one or more packet identifiers of the set of transport blocks to be encoded in the network coding packet.

In some examples, the request includes one or more additional source identifiers of additional transport blocks to be encoded in additional network coding packets, and one or more additional packet identifiers of the additional transport blocks.

In some examples, to support transmitting the request, the resource requesting component 725 may be configured as or otherwise support a means for periodically transmitting the request.

In some examples, the resource requesting component 725 may be configured as or otherwise support a means for detecting a trigger to transmit the request, where the request is transmitted based on detecting the trigger.

In some examples, to support receiving the grant, the grant receiving component 730 may be configured as or otherwise support a means for receiving downlink control information including the grant, where the downlink control information indicates the set of transport blocks to encode for the network coding packet and a set of destination identifiers of the set of multiple UEs.

In some examples, to support receiving the grant, the grant receiving component 730 may be configured as or otherwise support a means for receiving a RRC configuration message including the grant, where the RRC configuration message indicates the set of transport blocks to be encoded in the network coding packet and a set of destination identifiers of the set of multiple UEs.

In some examples, the grant indicates that the set of resources are for network coding packet transmission. In some examples, the grant indicates that the set of resources are for network coding signaling based on a radio network temporary identifier associated with network coding packet transmission.

In some examples, the grant indicates that the set of resources are for network coding packet transmission based on a field included with the grant. In some examples, the grant indicates that the set of resources are for network coding packet transmission based on a format of downlink control information including the grant. In some examples, the grant is transmitted using unicast signaling or multicast signaling.

In some examples, the request includes a set of transport block source identifiers for the set of transport blocks and a set of transport block packet identifiers for the set of transport blocks, and the network coding message includes one or more transport blocks of the set of transport blocks.

In some examples, the network coding request component 750 may be configured as or otherwise support a means for receiving, from a source UE, a second request to transmit the network coding message that includes the network coding packet, where the request for the resources is transmitted to the base station based on receiving the second request from the source UE.

In some examples, the network coding message component 735 may be configured as or otherwise support a means for receiving a set of multiple packets from the set of multiple UEs, where the network coding message includes the network coding packet and one or more packets of the set of multiple packets.

Figure 8:
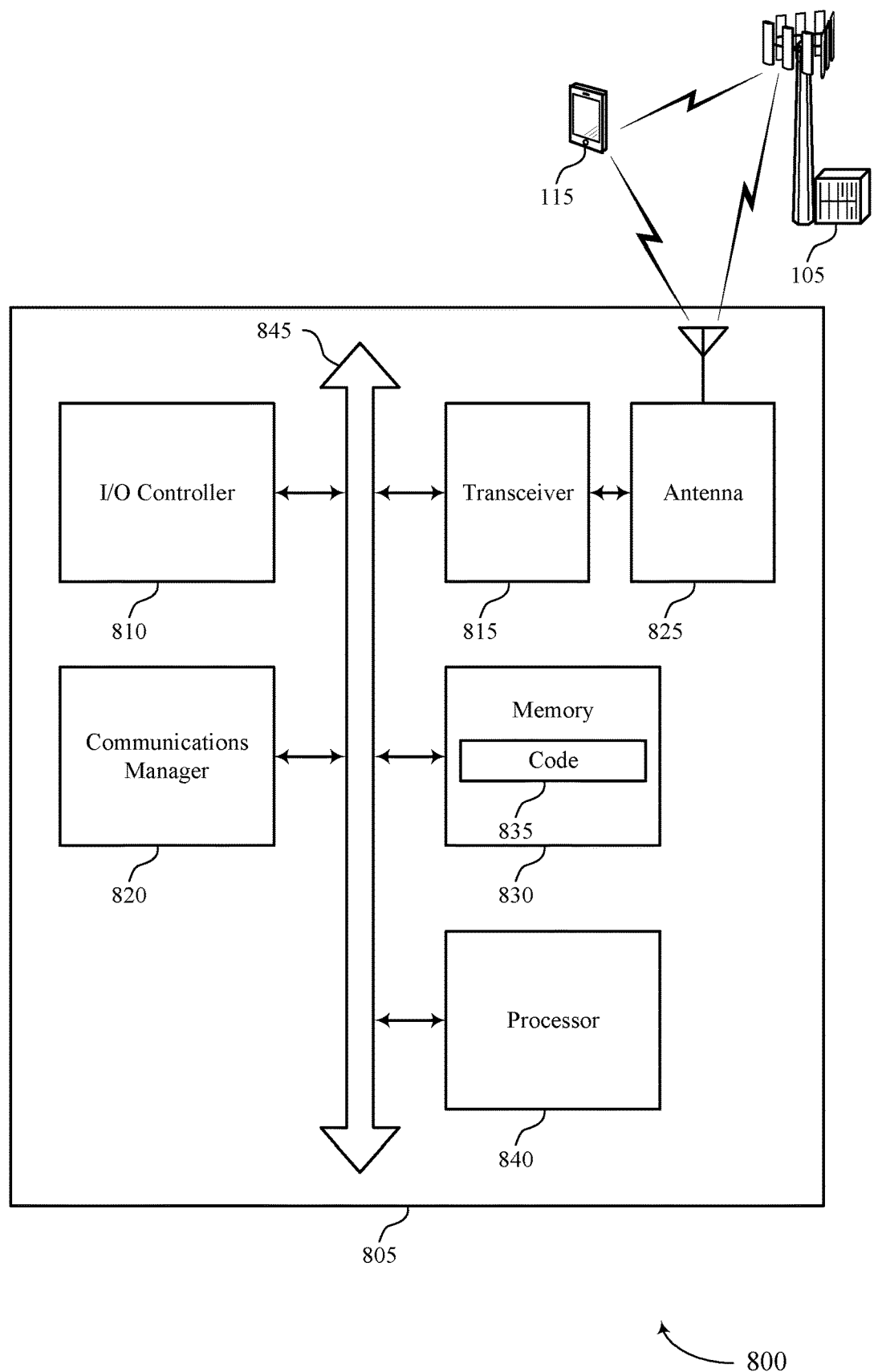
FIG. 8 shows a diagram of a system including a device that supports techniques for granting resources for network coding procedures in accordance with aspects of the present disclosure.

FIG. 8 shows a diagram of a system 800 including a device 805 that supports techniques for granting resources for network coding procedures in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for granting resources for network coding procedures). For example, the device 805 or a component of the device 805 may include a processor 840 and memory 830 coupled with or to the processor 840, the processor 840 and memory 830 configured to perform various functions described herein.

The communications manager 820 may support wireless communications at a wireless communications device in accordance with examples as disclosed herein. For example, the communications manager 820 may be configured as or otherwise support a means for transmitting, to a base station, a request for resources to transmit, by the wireless communications device and to a set of multiple UEs, a network coding message that includes a network coding packet that is representative of a set of transport blocks that are coded together. The communications manager 820 may be configured as or otherwise support a means for receiving, from the base station and responsive to the request, a grant allocating a set of resources for network coding packet transmission. The communications manager 820 may be configured as or otherwise support a means for transmitting the network coding message to the set of multiple UEs on the set of resources in accordance with the grant.

By including or configuring the communications manager 820 in accordance with examples as described herein, the device 805 may support techniques for more efficient utilization of communication resources by reducing a number of retransmissions in the system while maintaining retransmission efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for granting resources for network coding procedures as described herein, or the processor 840 and the memory 830 may be otherwise configured to perform or support such operations.

Figure 9:
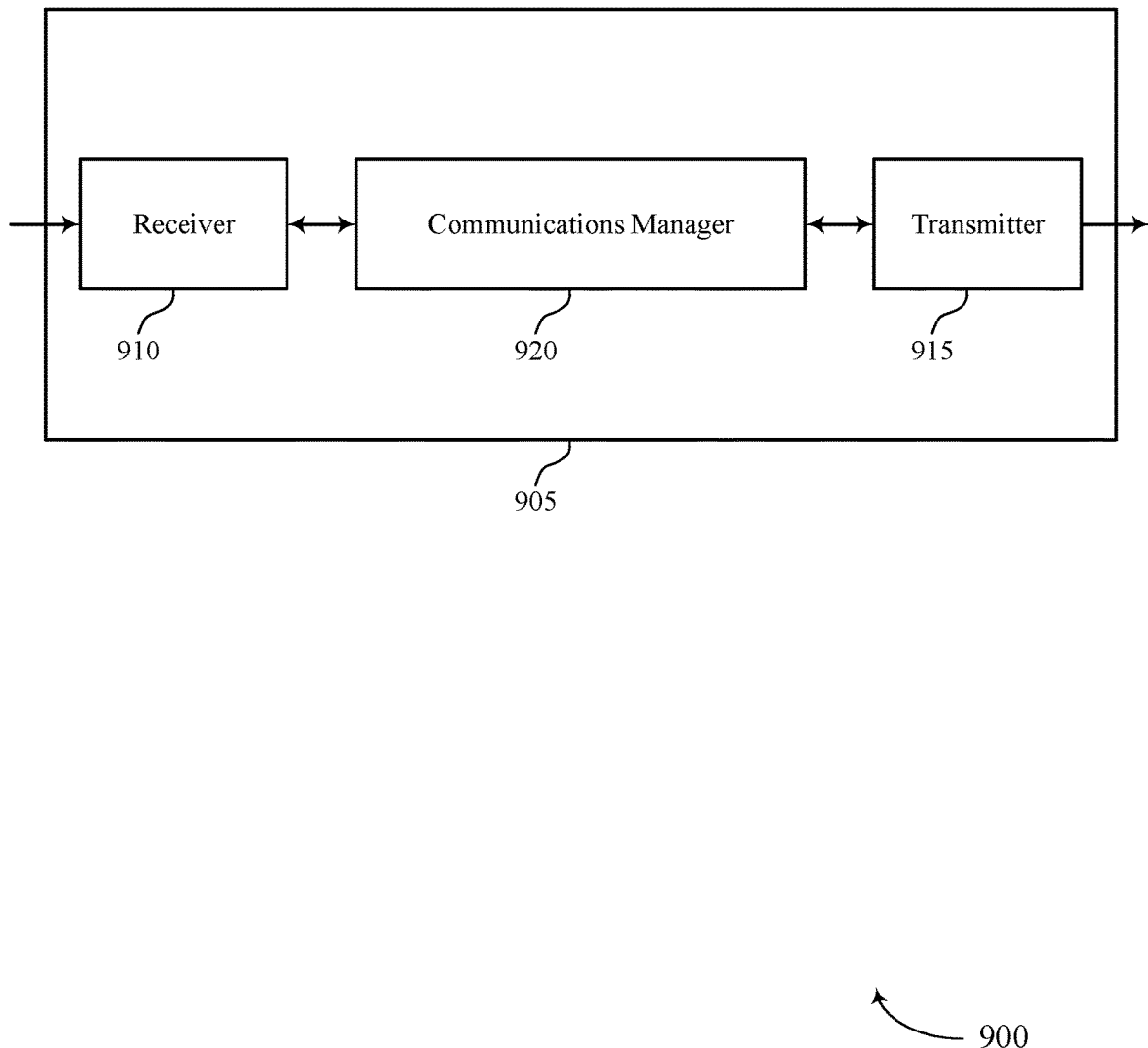
FIGS. 9 and 10 show block diagrams of devices that support techniques for granting resources for network coding procedures in accordance with aspects of the present disclosure.

FIG. 9 shows a block diagram 900 of a device 905 that supports techniques for granting resources for network coding procedures in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for granting resources for network coding procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for granting resources for network coding procedures). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for granting resources for network coding procedures as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a wireless communications device in accordance with examples as disclosed herein. For example, the communications manager 920 may be configured as or otherwise support a means for transmitting, to a base station, a request for resources to transmit, by the wireless communications device and to a set of multiple UEs, a network coding message that includes a network coding packet that is representative of a set of transport blocks that are coded together. The communications manager 920 may be configured as or otherwise support a means for receiving, from the base station and responsive to the request, a grant allocating a set of resources for network coding packet transmission. The communications manager 920 may be configured as or otherwise support a means for transmitting the network coding message to the set of multiple UEs on the set of resources in accordance with the grant.

Additionally or alternatively, the communications manager 920 may support wireless communications at a base station in accordance with examples as disclosed herein. For example, the communications manager 920 may be configured as or otherwise support a means for receiving, from a wireless communications device, a request for resources for the wireless communications device to transmit, by the wireless communications device to a set of multiple UEs, a network coding message that includes a network coding packet that is representative of a set of transport blocks that are coded together. The communications manager 920 may be configured as or otherwise support a means for transmitting, to the wireless communications device and responsive to the request, a grant allocating a set of resources for network coding packet transmission.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by reducing a number of retransmissions in the system while maintaining retransmission efficiency.

Figure 10:
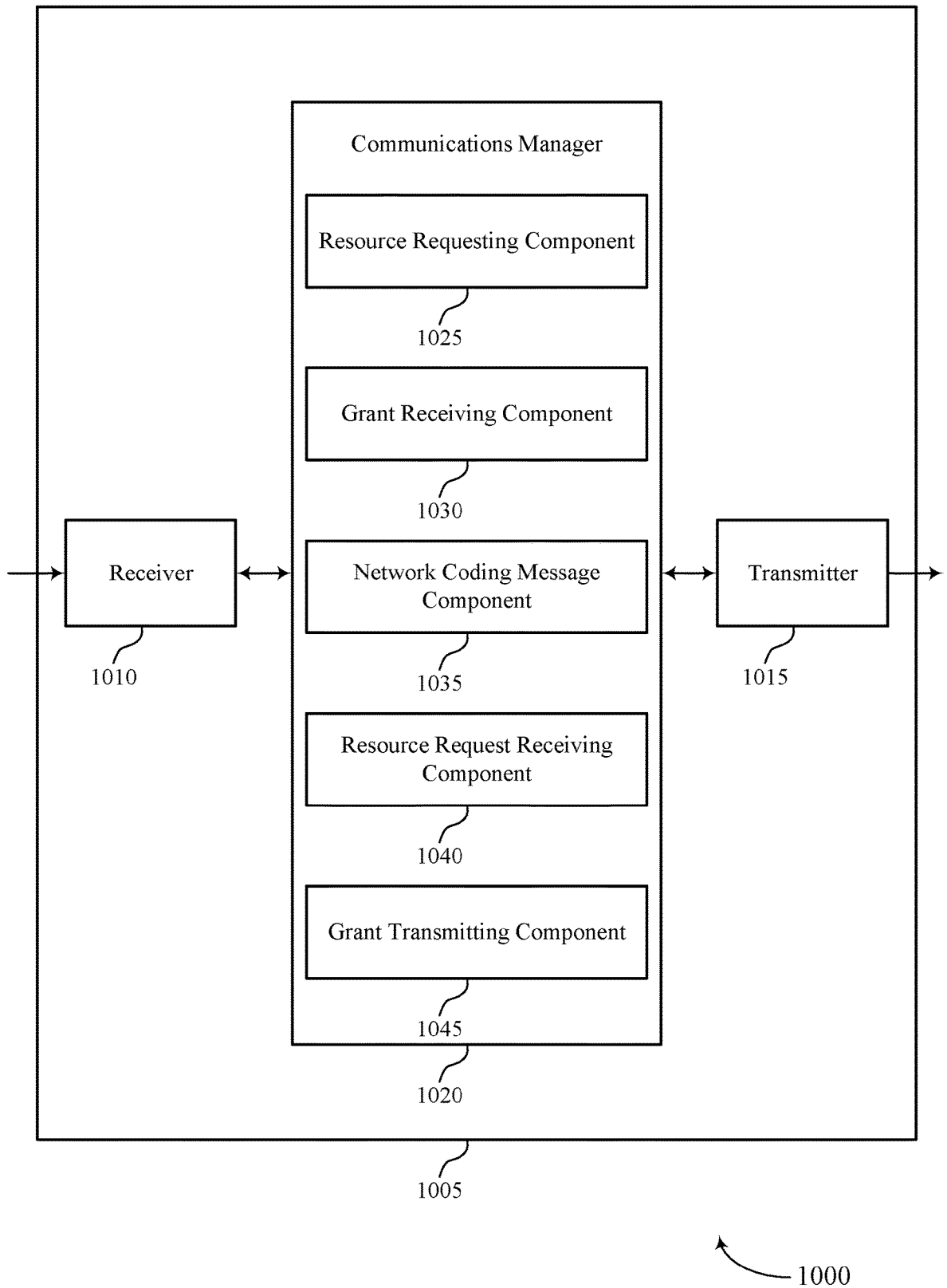

FIG. 10 shows a block diagram 1000 of a device 1005 that supports techniques for granting resources for network coding procedures in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for granting resources for network coding procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for granting resources for network coding procedures). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for granting resources for network coding procedures as described herein. For example, the communications manager 1020 may include a resource requesting component 1025, a grant receiving component 1030, a network coding message component 1035, a resource request receiving component 1040, a grant transmitting component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a wireless communications device in accordance with examples as disclosed herein. The resource requesting component 1025 may be configured as or otherwise support a means for transmitting, to a base station, a request for resources to transmit, by the wireless communications device and to a set of multiple UEs, a network coding message that includes a network coding packet that is representative of a set of transport blocks that are coded together. The grant receiving component 1030 may be configured as or otherwise support a means for receiving, from the base station and responsive to the request, a grant allocating a set of resources for network coding packet transmission. The network coding message component 1035 may be configured as or otherwise support a means for transmitting the network coding message to the set of multiple UEs on the set of resources in accordance with the grant.

Additionally or alternatively, the communications manager 1020 may support wireless communications at a base station in accordance with examples as disclosed herein. The resource request receiving component 1040 may be configured as or otherwise support a means for receiving, from a wireless communications device, a request for resources for the wireless communications device to transmit, by the wireless communications device to a set of multiple UEs, a network coding message that includes a network coding packet that is representative of a set of transport blocks that are coded together. The grant transmitting component 1045 may be configured as or otherwise support a means for transmitting, to the wireless communications device and responsive to the request, a grant allocating a set of resources for network coding packet transmission.

Figure 11:
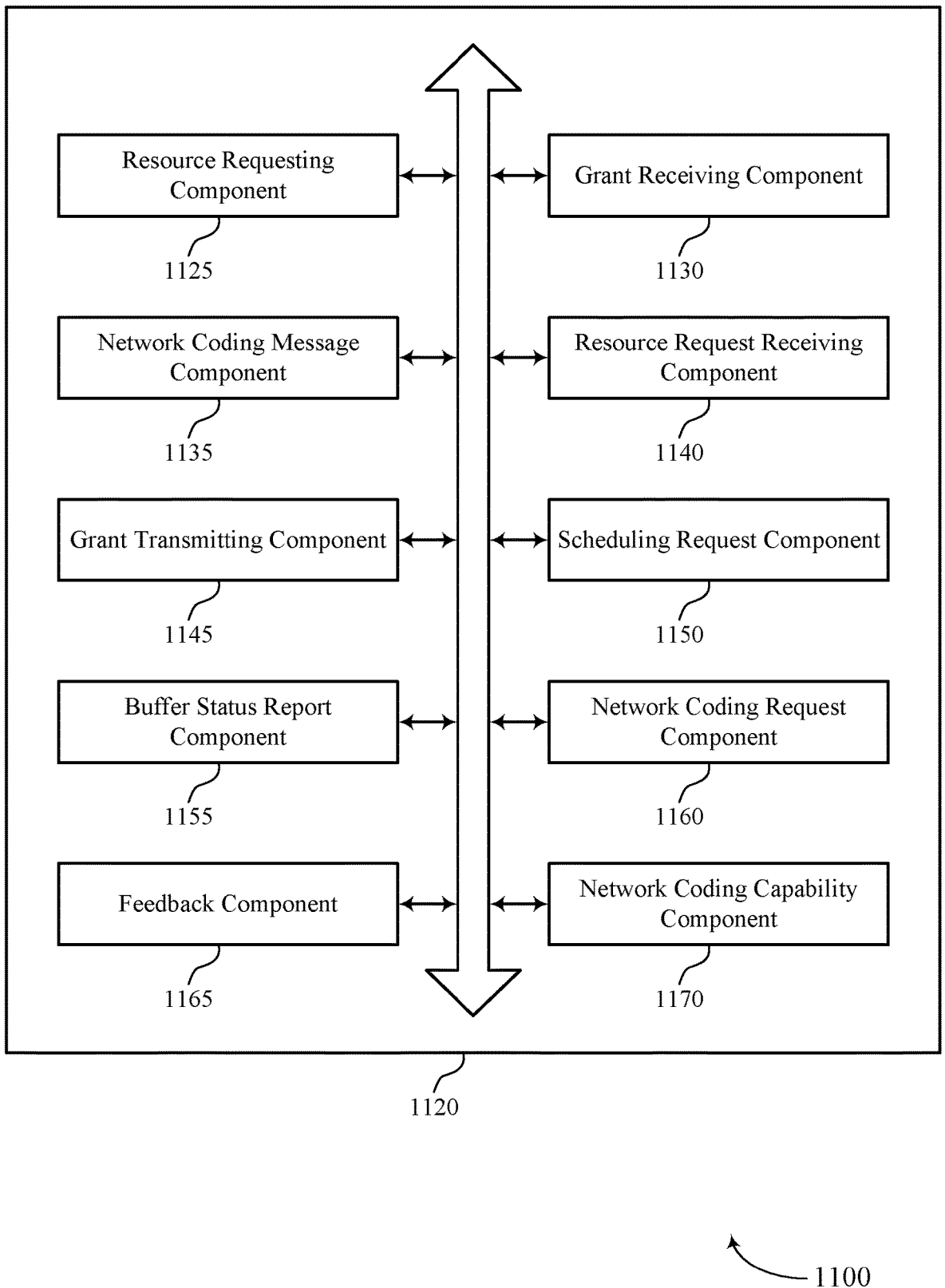
FIG. 11 shows a block diagram of a communications manager that supports techniques for granting resources for network coding procedures in accordance with aspects of the present disclosure.

FIG. 11 shows a block diagram 1100 of a communications manager 1120 that supports techniques for granting resources for network coding procedures in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for granting resources for network coding procedures as described herein. For example, the communications manager 1120 may include a resource requesting component 1125, a grant receiving component 1130, a network coding message component 1135, a resource request receiving component 1140, a grant transmitting component 1145, a scheduling request component 1150, a buffer status report component 1155, a network coding request component 1160, a feedback component 1165, a network coding capability component 1170, or any combination thereof. Each of these components may communicate, directly or indirectly, with one another (e.g., via one or more buses).

The communications manager 1120 may support wireless communications at a wireless communications device in accordance with examples as disclosed herein. The resource requesting component 1125 may be configured as or otherwise support a means for transmitting, to a base station, a request for resources to transmit, by the wireless communications device and to a set of multiple UEs, a network coding message that includes a network coding packet that is representative of a set of transport blocks that are coded together. The grant receiving component 1130 may be configured as or otherwise support a means for receiving, from the base station and responsive to the request, a grant allocating a set of resources for network coding packet transmission. The network coding message component 1135 may be configured as or otherwise support a means for transmitting the network coding message to the set of multiple UEs on the set of resources in accordance with the grant.

In some examples, to support transmitting the request, the scheduling request component 1150 may be configured as or otherwise support a means for transmitting a scheduling request associated with network coding packet transmission.

In some examples, to support transmitting the scheduling request, the scheduling request component 1150 may be configured as or otherwise support a means for transmitting, as the scheduling request, a sequence associated with network coding packet transmission.

In some examples, the sequence is an orthogonal sequence unique to the wireless communications device.

In some examples, the scheduling request component 1150 may be configured as or otherwise support a means for receiving, from the base station and prior to transmission of the scheduling request, an indication of the sequence, where the sequence is associated with the wireless communications device based on the indication.

In some examples, the scheduling request is transmitted using a group identifier associated with network coding packet transmission.

In some examples, the scheduling request is transmitted on a resource associated with network coding packet transmission.

In some examples, the network coding capability component 1170 may be configured as or otherwise support a means for transmitting, to the base station, an indication that the wireless communications device is capable of network coding packet transmission. In some examples, the network coding capability component 1170 may be configured as or otherwise support a means for receiving, in response to the indication, control signaling from the base station configuring the resource associated with network coding packet transmission.

In some examples, the resource associated with network coding packet transmission is unique to the wireless communications device or is configured for a group of wireless communications devices including the wireless communications device.

In some examples, to support transmitting the request, the buffer status report component 1155 may be configured as or otherwise support a means for transmitting a buffer status report associated with network coding packet transmission.

In some examples, a bit in the buffer status report indicates that the buffer status report is associated with network coding packet transmission.

In some examples, to support transmitting the request, the resource requesting component 1125 may be configured as or otherwise support a means for transmitting NACK feedback associated with a set of multiple packets for the set of multiple UEs.

In some examples, the NACK feedback includes an identifier associated with network coding packet transmission. In some examples, the identifier is associated with a packet identifier of the network coding packet.

In some examples, the grant receiving component 1130 may be configured as or otherwise support a means for receiving control signaling from the base station configuring a dedicated resource for the request that is associated with network coding packet transmission, where the request is transmitted on the dedicated resource.

In some examples, the request includes one or more source identifiers of the set of transport blocks to be encoded in the network coding packet and one or more packet identifiers of the set of transport blocks to be encoded in the network coding packet. In some examples, the request includes one or more additional source identifiers of additional transport blocks to be encoded in additional network coding packets, and one or more additional packet identifiers of the additional transport blocks.

In some examples, to support transmitting the request, the resource requesting component 1125 may be configured as or otherwise support a means for periodically transmitting the request.

In some examples, the resource requesting component 1125 may be configured as or otherwise support a means for detecting a trigger to transmit the request, where the request is transmitted based on detecting the trigger.

In some examples, to support receiving the grant, the grant receiving component 1130 may be configured as or otherwise support a means for receiving downlink control information including the grant, where the downlink control information indicates the set of transport blocks to encode for the network coding packet and a set of destination identifiers of the set of multiple UEs.

In some examples, to support receiving the grant, the grant receiving component 1130 may be configured as or otherwise support a means for receiving a RRC configuration message including the grant, where the RRC configuration message indicates the set of transport blocks to be encoded in the network coding packet and a set of destination identifiers of the set of multiple UEs.

In some examples, the grant indicates that the set of resources are for network coding packet transmission. In some examples, the grant indicates that the set of resources are for network coding signaling based on a radio network temporary identifier associated with network coding packet transmission.

In some examples, the grant indicates that the set of resources are for network coding packet transmission based on a field included with the grant. In some examples, the grant indicates that the set of resources are for network coding packet transmission based on a format of downlink control information including the grant.

In some examples, the grant is transmitted using unicast signaling or multicast signaling. In some examples, the request includes a set of transport block source identifiers for the set of transport blocks and a set of transport block packet identifiers for the set of transport blocks, and the network coding message includes one or more transport blocks of the set of transport blocks.

In some examples, the network coding request component 1160 may be configured as or otherwise support a means for receiving, from a source UE, a second request to transmit the network coding message that includes the network coding packet, where the request for the resources is transmitted to the base station based on receiving the second request from the source UE.

In some examples, the network coding message component 1135 may be configured as or otherwise support a means for receiving a set of multiple packets from the set of multiple UEs, where the network coding message includes the network coding packet and one or more packets of the set of multiple packets.

Additionally or alternatively, the communications manager 1120 may support wireless communications at a base station in accordance with examples as disclosed herein. The resource request receiving component 1140 may be configured as or otherwise support a means for receiving, from a wireless communications device, a request for resources for the wireless communications device to transmit, by the wireless communications device to a set of multiple UEs, a network coding message that includes a network coding packet that is representative of a set of transport blocks that are coded together. The grant transmitting component 1145 may be configured as or otherwise support a means for transmitting, to the wireless communications device and responsive to the request, a grant allocating a set of resources for network coding packet transmission.

In some examples, to support receiving the request, the scheduling request component 1150 may be configured as or otherwise support a means for receiving a scheduling request associated with network coding packet transmission.

In some examples, to support receiving the request, the scheduling request component 1150 may be configured as or otherwise support a means for receiving, as the scheduling request, a sequence associated with network coding packet transmission.

In some examples, the sequence is an orthogonal sequence unique to the wireless communications device.

In some examples, the scheduling request component 1150 may be configured as or otherwise support a means for transmitting, to the wireless communications device and prior to receiving the scheduling request, an indication of the sequence, where the sequence is associated with the wireless communications device based on the indication.

In some examples, the scheduling request is received using a group identifier associated with network coding packet transmission. In some examples, the scheduling request is received on a resource associated with network coding packet transmission.

In some examples, the network coding capability component 1170 may be configured as or otherwise support a means for receiving, from the wireless communications device, an indication that the wireless communications device is capable of network coding packet transmission. In some examples, the network coding capability component 1170 may be configured as or otherwise support a means for transmitting, in response to the indication, control signaling to the wireless communications device configuring the resource associated with network coding packet transmission.

In some examples, the resource associated with network coding packet transmission is unique to the wireless communications device or is configured for a group of wireless communications devices including the wireless communications device.

In some examples, to support receiving the request, the buffer status report component 1155 may be configured as or otherwise support a means for receiving a buffer status report associated with network coding packet transmission.

In some examples, a bit in the buffer status report indicates that the buffer status report is associated with network coding packet transmission.

In some examples, to support receiving the request, the resource request receiving component 1140 may be configured as or otherwise support a means for receiving NACK feedback associated with a set of multiple packets for the set of multiple UEs.

In some examples, the NACK feedback includes an identifier associated with network coding packet transmission. In some examples, the identifier is associated with a packet identifier of the network coding packet.

In some examples, the resource request receiving component 1140 may be configured as or otherwise support a means for transmitting control signaling to the wireless communications device configuring a dedicated resource for the request that is associated with network coding packet transmission, where the request is received on the dedicated resource.

In some examples, the request includes one or more source identifiers of the set of transport blocks to be encoded in the network coding packet and one or more packet identifiers of the set of transport blocks to be encoded in the network coding packet.

In some examples, the request includes one or more additional source identifiers of additional transport blocks to be encoded in additional network coding packets, and one or more additional packet identifiers of the additional transport blocks. In some examples, the request is received periodically.

In some examples, to support transmitting the grant, the grant transmitting component 1145 may be configured as or otherwise support a means for transmitting downlink control information including the grant, where the downlink control information indicates the set of transport blocks to encode for the network coding packet and a set of destination identifiers of the set of multiple UEs.

In some examples, to support transmitting the grant, the grant transmitting component 1145 may be configured as or otherwise support a means for transmitting a RRC configuration message including the grant, where the RRC configuration message indicates the set of transport blocks to be encoded in the network coding packet and a set of destination identifiers of the set of multiple UEs.

In some examples, the grant indicates that the set of resources are for network coding packet transmission. In some examples, the grant indicates that the set of resources are for network coding signaling based on a radio network temporary identifier associated with network coding packet transmission. In some examples, the grant indicates that the set of resources are for network coding packet transmission based on a field included with the grant. In some examples, the grant indicates that the set of resources are for network coding packet transmission based on a format of downlink control information including the grant. In some examples, the grant is transmitted using unicast signaling or multicast signaling.

In some examples, the feedback component 1165 may be configured as or otherwise support a means for receiving, from a first UE of the set of multiple UEs, a NACK for at least a first packet transmitted by a second UE to the first UE. In some examples, the feedback component 1165 may be configured as or otherwise support a means for receiving, from the second UE, an ACK for at least the first packet. In some examples, the feedback component 1165 may be configured as or otherwise support a means for refraining from allocating a resource to the second UE for retransmitting at least the first packet based on receiving the ACK.

Figure 12:
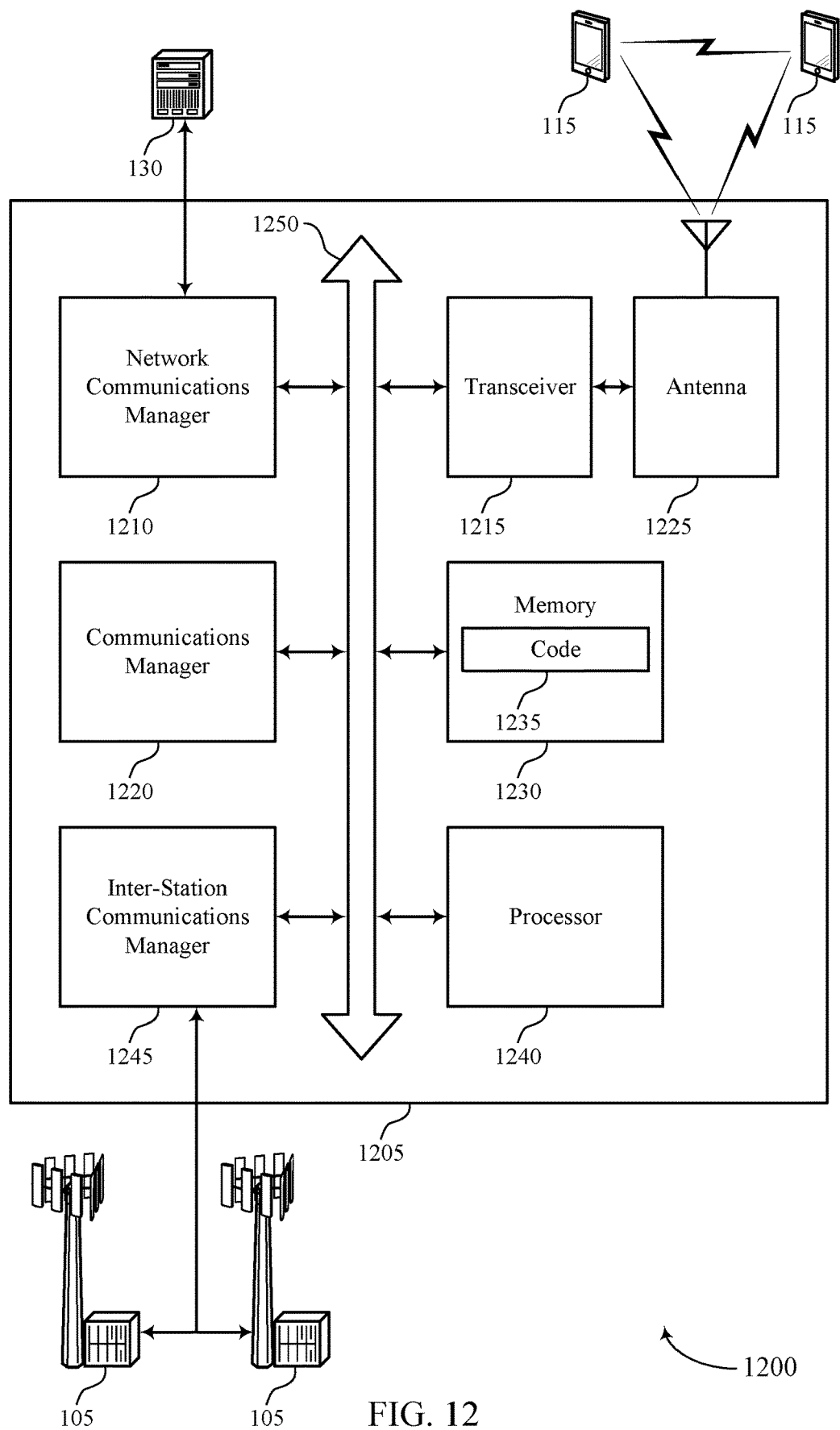
FIG. 12 shows a diagram of a system including a device that supports techniques for granting resources for network coding procedures in accordance with aspects of the present disclosure.

FIG. 12 shows a diagram of a system 1200 including a device 1205 that supports techniques for granting resources for network coding procedures in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code

1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for granting resources for network coding procedures). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a wireless communications device in accordance with examples as disclosed herein. For example, the communications manager 1220 may be configured as or otherwise support a means for transmitting, to a base station, a request for resources to transmit, by the wireless communications device and to a set of multiple UEs, a network coding message that includes a network coding packet that is representative of a set of transport blocks that are coded together. The communications manager 1220 may be configured as or otherwise support a means for receiving, from the base station and responsive to the request, a grant allocating a set of resources for network coding packet transmission. The communications manager 1220 may be configured as or otherwise support a means for transmitting the network coding message to the set of multiple UEs on the set of resources in accordance with the grant.

Additionally or alternatively, the communications manager 1220 may support wireless communications at a base station in accordance with examples as disclosed herein. For example, the communications manager 1220 may be configured as or otherwise support a means for receiving, from a wireless communications device, a request for resources for the wireless communications device to transmit, by the wireless communications device to a set of multiple UEs, a network coding message that includes a network coding packet that is representative of a set of transport blocks that are coded together. The communications manager 1220 may be configured as or otherwise support a means for transmitting, to the wireless communications device and responsive to the request, a grant allocating a set of resources for network coding packet transmission.

By including or configuring the communications manager 1220 in accordance with examples as described herein, the device 1205 may support techniques for more efficient utilization of communication resources by reducing a number of retransmissions in the system while maintaining retransmission efficiency. Additionally, these techniques may provide improved coordination between devices to efficiently communicate network coding messages for retransmissions.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for granting resources for network coding procedures as described herein, or the processor 1240 and the memory 1230 may be otherwise configured to perform or support such operations.

Figure 13:
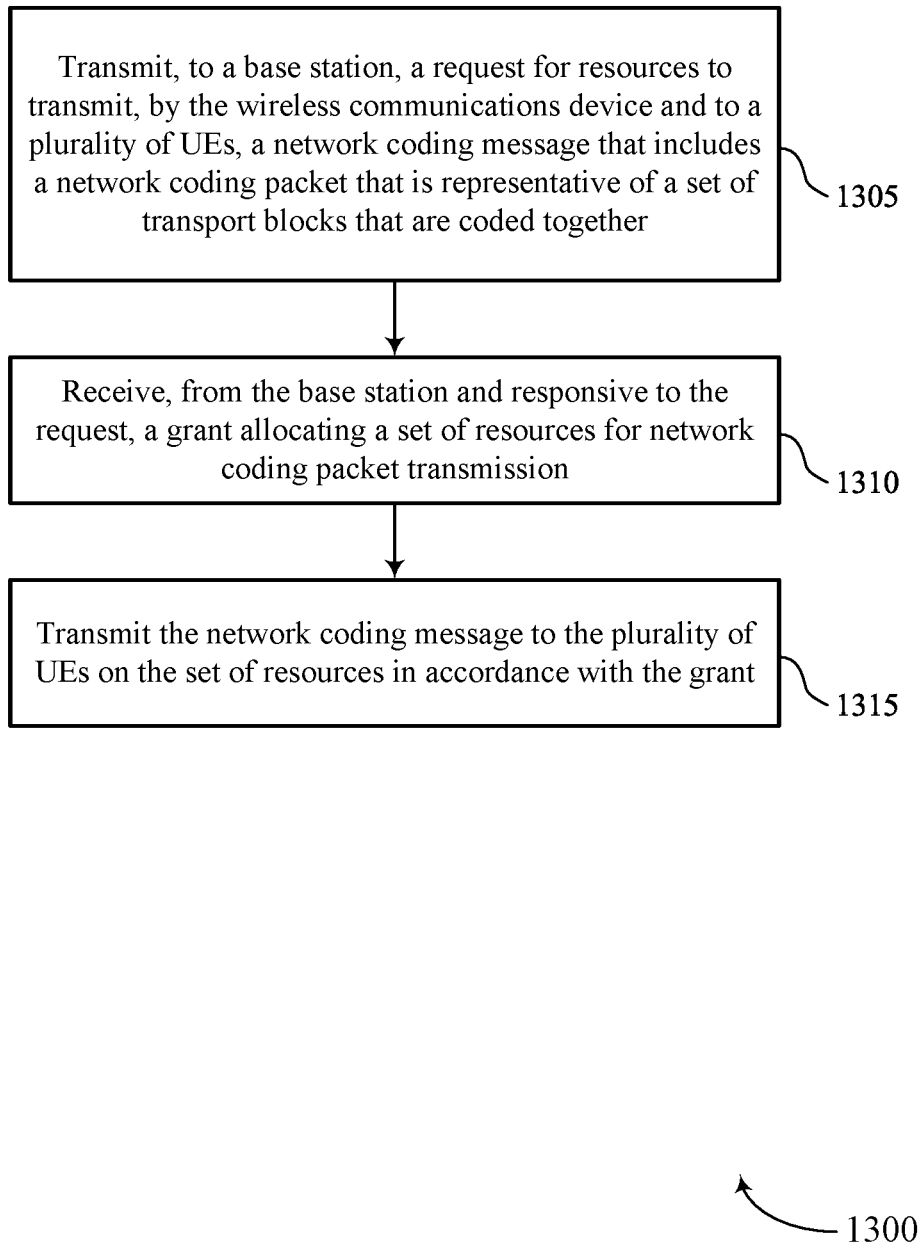
FIGS. 13 through 17 show flowcharts illustrating methods that support techniques for granting resources for network coding procedures in accordance with aspects of the present disclosure.

FIG. 13 shows a flowchart illustrating a method 1300 that supports techniques for granting resources for network coding procedures in accordance with aspects of the present disclosure. The operations of the method 1300 may be implemented by a UE or a base station or its components as described herein. For example, the operations of the method 1300 may be performed by a UE 115 as described with reference to FIGS. 1 through 8 or a base station 105 as described with reference to FIGS. 1 through 4 and 9 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include transmitting, to a base station, a request for resources to transmit, by the wireless communications device and to a set of multiple UEs, a network coding message that includes a network coding packet that is representative of a set of transport blocks that are coded together. The operations of 1305 may be performed in accordance with examples as disclosed herein. In some examples, aspects of the operations of 1305 may be performed by a resource requesting component 725 or a resource requesting component 1125 as described with reference to FIGS. 7 and 11.

At 1310, the method may include receiving, from the base station and responsive to the request, a grant allocating a set of resources for network coding packet transmission. The operations of 1310 may be performed in accordance with examples as disclosed herein. In some examples, aspects of the operations of 1310 may be performed by a grant receiving component 730 or a grant receiving component 1130 as described with reference to FIGS. 7 and 11.

At 1315, the method may include transmitting the network coding message to the set of multiple UEs on the set of resources in accordance with the grant. The operations of 1315 may be performed in accordance with examples as disclosed herein. In some examples, aspects of the operations of 1315 may be performed by a network coding message component 735 or a network coding message component 1135 as described with reference to FIGS. 7 and 11.

Figure 14:
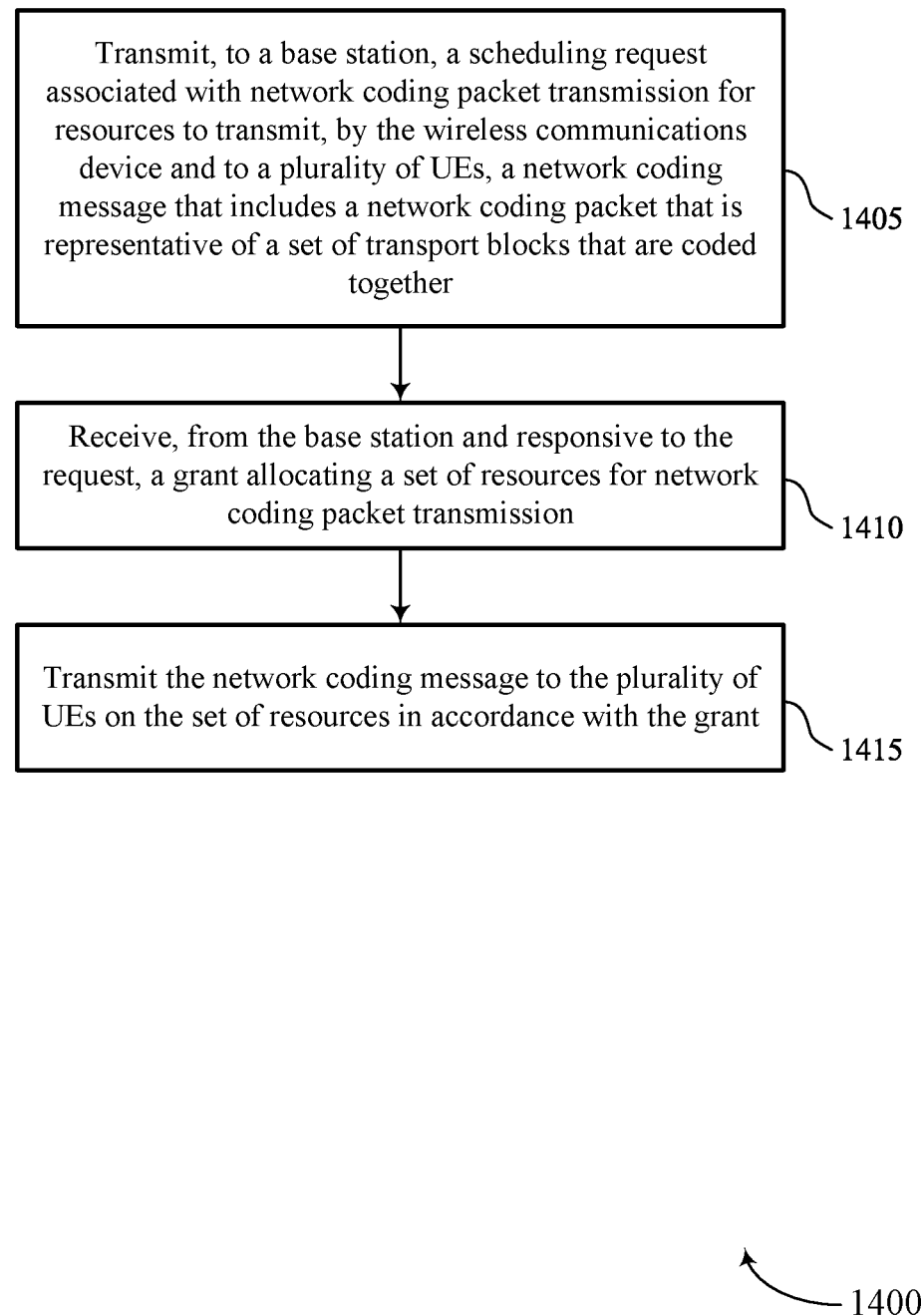

FIG. 14 shows a flowchart illustrating a method 1400 that supports techniques for granting resources for network coding procedures in accordance with aspects of the present disclosure. The operations of the method 1400 may be implemented by a UE or a base station or its components as described herein. For example, the operations of the method 1400 may be performed by a UE 115 as described with reference to FIGS. 1 through 8 or a base station 105 as described with reference to FIGS. 1 through 4 and 9 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include transmitting, to a base station, a scheduling request associated with network coding packet transmission, the scheduling request for resources to transmit, by the wireless communications device and to a set of multiple UEs, a network coding message that includes a network coding packet that is representative of a set of transport blocks that are coded together. The operations of 1405 may be performed in accordance with examples as disclosed herein. In some examples, aspects of the operations of 1405 may be performed by a resource requesting component 725 or a resource requesting component 1125 as described with reference to FIGS. 7 and 11.

At 1410, the method may include receiving, from the base station and responsive to the request, a grant allocating a set of resources for network coding packet transmission. The operations of 1410 may be performed in accordance with examples as disclosed herein. In some examples, aspects of the operations of 1410 may be performed by a grant receiving component 730 or a grant receiving component 1130 as described with reference to FIGS. 7 and 11.

At 1415, the method may include transmitting the network coding message to the set of multiple UEs on the set of resources in accordance with the grant. The operations of 1415 may be performed in accordance with examples as disclosed herein. In some examples, aspects of the operations of 1415 may be performed by a network coding message component 735 or a network coding message component 1135 as described with reference to FIGS. 7 and 11.

Figure 15:
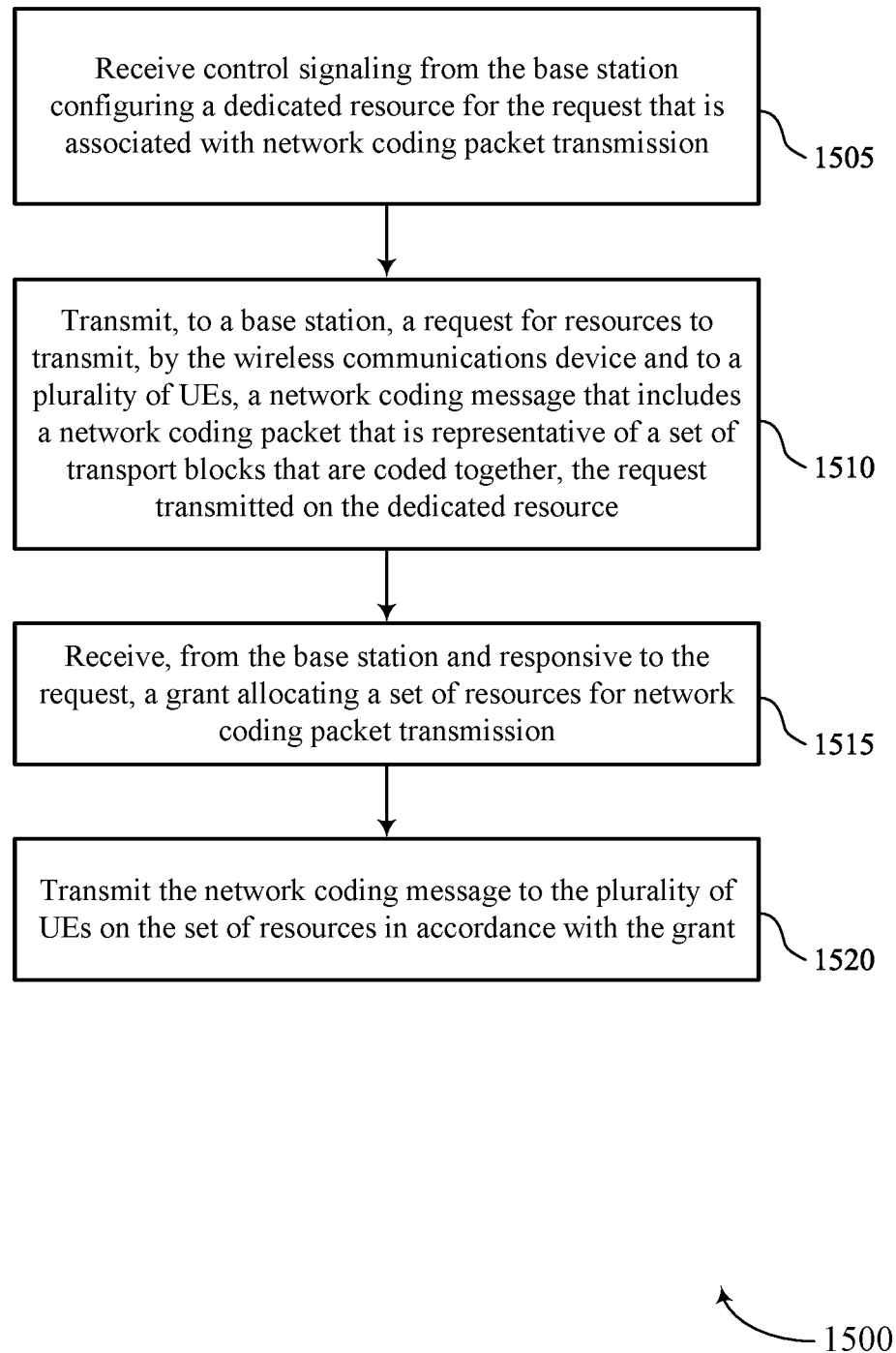

FIG. 15 shows a flowchart illustrating a method 1500 that supports techniques for granting resources for network coding procedures in accordance with aspects of the present disclosure. The operations of the method 1500 may be implemented by a UE or a base station or its components as described herein. For example, the operations of the method 1500 may be performed by a UE 115 as described with reference to FIGS. 1 through 8 or a base station 105 as described with reference to FIGS. 1 through 4 and 9 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving control signaling from the base station configuring a dedicated resource for the request that is associated with network coding packet transmission. The operations of 1505 may be performed in accordance with examples as disclosed herein. In some examples, aspects of the operations of 1505 may be performed by a grant receiving component 730 or a grant receiving component 1130 as described with reference to FIGS. 7 and 11.

At 1510, the method may include transmitting, to a base station, a request for resources to transmit, by the wireless communications device and to a set of multiple UEs, a network coding message that includes a network coding packet that is representative of a set of transport blocks that are coded together. The request may be transmitted on the dedicated resource. The operations of 1510 may be performed in accordance with examples as disclosed herein. In some examples, aspects of the operations of 1510 may be performed by a resource requesting component 725 or a resource requesting component 1125 as described with reference to FIGS. 7 and 11.

At 1515, the method may include receiving, from the base station and responsive to the request, a grant allocating a set of resources for network coding packet transmission. The operations of 1515 may be performed in accordance with examples as disclosed herein. In some examples, aspects of the operations of 1515 may be performed by a grant receiving component 730 or a grant receiving component 1130 as described with reference to FIGS. 7 and 11.

At 1520, the method may include transmitting the network coding message to the set of multiple UEs on the set of resources in accordance with the grant. The operations of 1520 may be performed in accordance with examples as disclosed herein. In some examples, aspects of the operations of 1520 may be performed by a network coding message component 735 or a network coding message component 1135 as described with reference to FIGS. 7 and 11.

Figure 16:
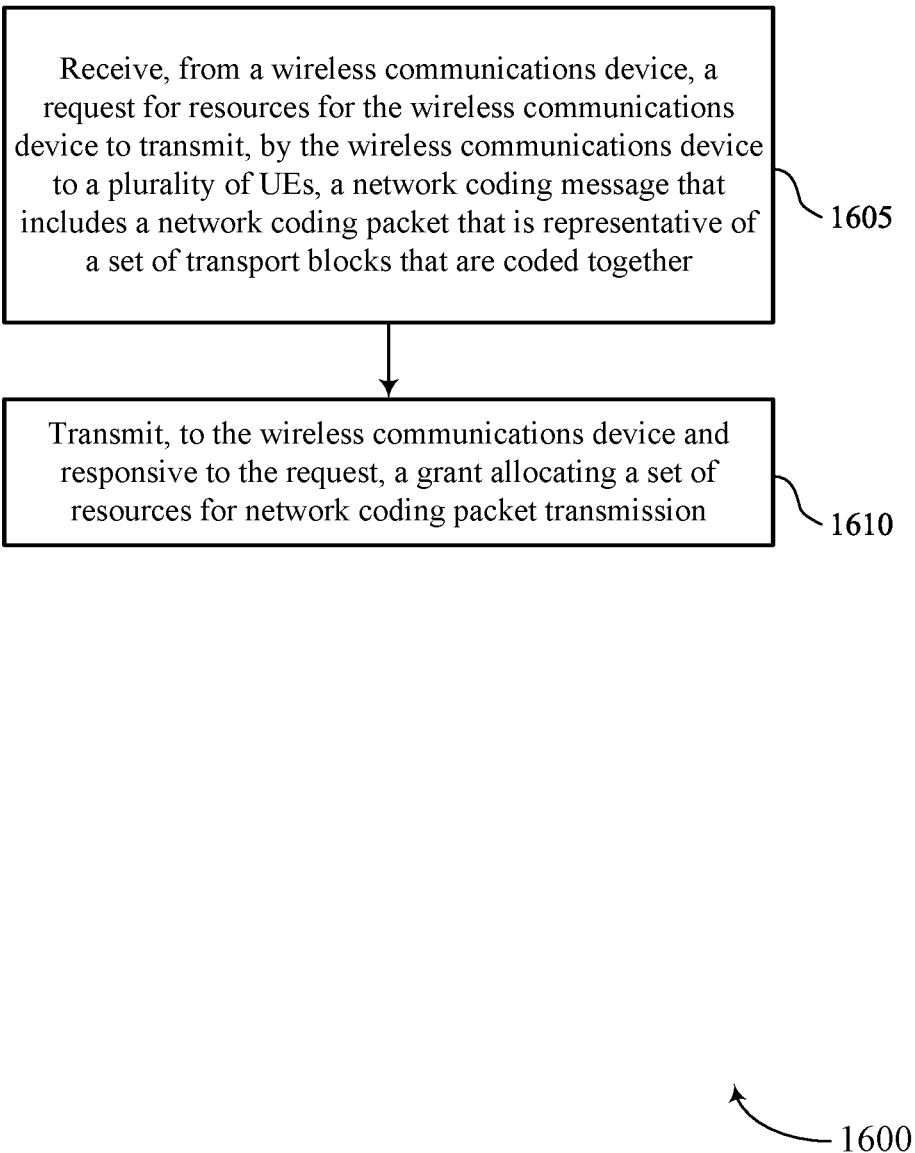

FIG. 16 shows a flowchart illustrating a method 1600 that supports techniques for granting resources for network coding procedures in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a wireless communications device, a request for resources for the wireless communications device to transmit, by the wireless communications device to a set of multiple UEs, a network coding message that includes a network coding packet that is representative of a set of transport blocks that are coded together. The operations of 1605 may be performed in accordance with examples as disclosed herein. In some examples, aspects of the operations of 1605 may be performed by a resource request receiving component 1140 as described with reference to FIG. 11.

At 1610, the method may include transmitting, to the wireless communications device and responsive to the request, a grant allocating a set of resources for network coding packet transmission. The operations of 1610 may be performed in accordance with examples as disclosed herein. In some examples, aspects of the operations of 1610 may be performed by a grant transmitting component 1145 as described with reference to FIG. 11.

Figure 17:
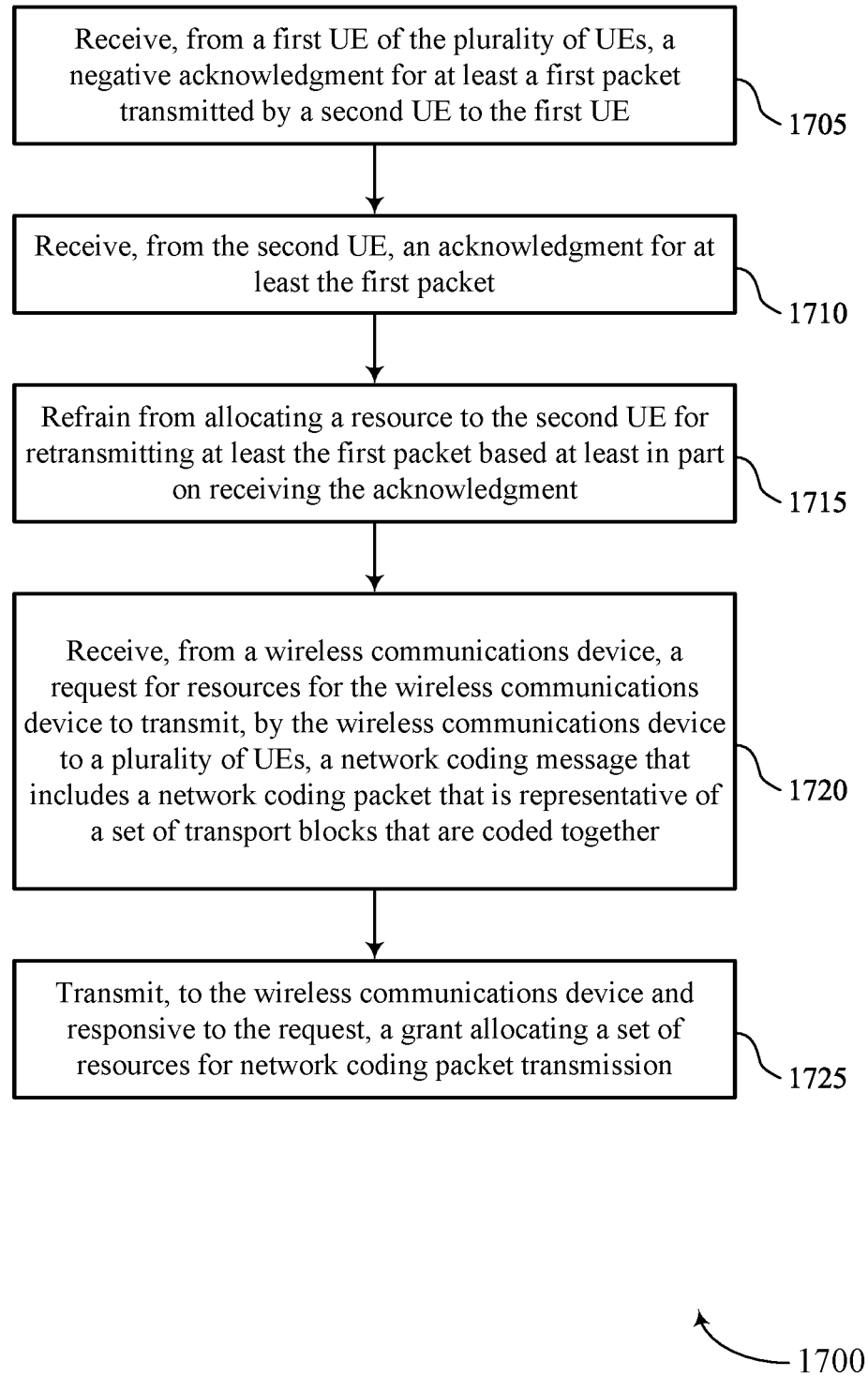

FIG. 17 shows a flowchart illustrating a method 1700 that supports techniques for granting resources for network coding procedures in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a first UE of the set of multiple UEs, a negative acknowledgment for at least a first packet transmitted by a second UE to the first UE. The operations of 1705 may be performed in accordance with examples as disclosed herein. In some examples, aspects of the operations of 1705 may be performed by a feedback component 1165 as described with reference to FIG. 11.

At 1710, the method may include receiving, from the second UE, an acknowledgment for at least the first packet. The operations of 1710 may be performed in accordance with examples as disclosed herein. In some examples, aspects of the operations of 1710 may be performed by a feedback component 1165 as described with reference to FIG. 11.

At 1715, the method may include refraining from allocating a resource to the second UE for retransmitting at least the first packet based on receiving the acknowledgment. The operations of 1715 may be performed in accordance with examples as disclosed herein. In some examples, aspects of the operations of 1715 may be performed by a feedback component 1165 as described with reference to FIG. 11.

At 1720, the method may include receiving, from a wireless communications device, a request for resources for the wireless communications device to transmit, by the wireless communications device to a set of multiple UEs, a network coding message that includes a network coding packet that is representative of a set of transport blocks that are coded together. The operations of 1720 may be performed in accordance with examples as disclosed herein. In some examples, aspects of the operations of 1720 may be performed by a resource request receiving component 1140 as described with reference to FIG. 11.

At 1725, the method may include transmitting, to the wireless communications device and responsive to the request, a grant allocating a set of resources for network coding packet transmission. The operations of 1725 may be performed in accordance with examples as disclosed herein. In some examples, aspects of the operations of 1725 may be performed by a grant transmitting component 1145 as described with reference to FIG. 11.

The following provides an overview of aspects of the present disclosure:

Aspect 1: A method for wireless communications at a wireless communications device, comprising: transmitting, to a base station, a request for resources to transmit, by the wireless communications device and to a plurality of user equipment (UEs), a network coding message that includes a network coding packet that is representative of a set of transport blocks that are coded together; receiving, from the base station and responsive to the request, a grant allocating a set of resources for network coding packet transmission; and transmitting the network coding message to the plurality of UEs on the set of resources in accordance with the grant.

Aspect 2: The method of aspect 1, wherein transmitting the request comprises: transmitting a scheduling request associated with network coding packet transmission.

Aspect 3: The method of aspect 2, wherein transmitting the scheduling request further comprises: transmitting, as the scheduling request, a sequence associated with network coding packet transmission.

Aspect 4: The method of aspect 3, wherein the sequence is an orthogonal sequence unique to the wireless communications device.

Aspect 5: The method of any of aspects 3 through 4, further comprising: receiving, from the base station and prior to transmission of the scheduling request, an indication of the sequence, wherein the sequence is associated with the wireless communications device based at least in part on the indication.

Aspect 6: The method of any of aspects 2 through 5, wherein the scheduling request is transmitted using a group identifier associated with network coding packet transmission.

Aspect 7: The method of any of aspects 2 through 6, wherein the scheduling request is transmitted on a resource associated with network coding packet transmission.

Aspect 8: The method of aspect 7, further comprising: transmitting, to the base station, an indication that the wireless communications device is capable of network coding packet transmission; and receiving, in response to the indication, control signaling from the base station configuring the resource associated with network coding packet transmission.

Aspect 9: The method of any of aspects 7 through 8, wherein the resource associated with network coding packet transmission is unique to the wireless communications device or is configured for a group of wireless communications devices including the wireless communications device.

Aspect 10: The method of aspect 1, wherein transmitting the request comprises: transmitting a buffer status report associated with network coding packet transmission.

Aspect 11: The method of aspect 10, wherein a bit in the buffer status report indicates that the buffer status report is associated with network coding packet transmission.

Aspect 12: The method of any of aspects 1 through 11, wherein transmitting the request comprises: transmitting negative acknowledgment feedback associated with a plurality of packets for the plurality of UEs.

Aspect 13: The method of aspect 12, wherein the negative acknowledgment feedback includes an identifier associated with network coding packet transmission.

Aspect 14: The method of aspect 13, wherein the identifier is associated with a packet identifier of the network coding packet.

Aspect 15: The method of any of aspects 1 through 14, further comprising: receiving control signaling from the base station configuring a dedicated resource for the request that is associated with network coding packet transmission, wherein the request is transmitted on the dedicated resource.

Aspect 16: The method of aspect 15, wherein the request includes one or more source identifiers of the set of transport blocks to be encoded in the network coding packet and one or more packet identifiers of the set of transport blocks to be encoded in the network coding packet.

Aspect 17: The method of aspect 16, wherein the request includes one or more additional source identifiers of additional transport blocks to be encoded in additional network coding packets, and one or more additional packet identifiers of the additional transport blocks.

Aspect 18: The method of any of aspects 1 through 17, wherein transmitting the request comprises: periodically transmitting the request.

Aspect 19: The method of any of aspects 1 through 18, further comprising: detecting a trigger to transmit the request, wherein the request is transmitted based at least in part on detecting the trigger.

Aspect 20: The method of any of aspects 1 through 19, wherein receiving the grant comprises: receiving downlink control information including the grant, wherein the downlink control information indicates the set of transport blocks to encode for the network coding packet and a set of destination identifiers of the plurality of UEs.

Aspect 21: The method of any of aspects 1 through 20, wherein receiving the grant comprises: receiving a radio resource control configuration message including the grant, wherein the radio resource control configuration message indicates the set of transport blocks to be encoded in the network coding packet and a set of destination identifiers of the plurality of UEs.

Aspect 22: The method of any of aspects 1 through 21, wherein the grant indicates that the set of resources are for network coding packet transmission.

Aspect 23: The method of aspect 22, wherein the grant indicates that the set of resources are for network coding signaling based at least in part on a radio network temporary identifier associated with network coding packet transmission.

Aspect 24: The method of any of aspects 22 through 23, wherein the grant indicates that the set of resources are for network coding packet transmission based at least in part on a field included with the grant.

Aspect 25: The method of any of aspects 22 through 24, wherein the grant indicates that the set of resources are for network coding packet transmission based at least in part on a format of downlink control information comprising the grant.

Aspect 26: The method of any of aspects 1 through 25, wherein the grant is transmitted using unicast signaling or multicast signaling.

Aspect 27: The method of any of aspects 1 through 26, wherein the request includes a set of transport block source identifiers for the set of transport blocks and a set of transport block packet identifiers for the set of transport blocks, and the network coding message includes one or more transport blocks of the set of transport blocks.

Aspect 28: The method of any of aspects 1 through 27, further comprising: receiving, from a source UE, a second request to transmit the network coding message that includes the network coding packet, wherein the request for the resources is transmitted to the base station based at least in part on receiving the second request from the source UE.

Aspect 29: The method of any of aspects 1 through 28, further comprising: receiving a plurality of packets from the plurality of UEs, wherein the network coding message includes the network coding packet and one or more packets of the plurality of packets.

Aspect 30: A method for wireless communications at a base station, comprising: receiving, from a wireless communications device, a request for resources for the wireless communications device to transmit, by the wireless communications device to a plurality of user equipment (UEs), a network coding message that includes a network coding packet that is representative of a set of transport blocks that are coded together; and transmitting, to the wireless communications device and responsive to the request, a grant allocating a set of resources for network coding packet transmission.

Aspect 31: The method of aspect 30, wherein receiving the request comprises: receiving a scheduling request associated with network coding packet transmission.

Aspect 32: The method of aspect 31, wherein receiving the request comprises: receiving, as the scheduling request, a sequence associated with network coding packet transmission.

Aspect 33: The method of aspect 32, wherein the sequence is an orthogonal sequence unique to the wireless communications device.

Aspect 34: The method of any of aspects 32 through 33, further comprising: transmitting, to the wireless communications device and prior to receiving the scheduling request, an indication of the sequence, wherein the sequence is associated with the wireless communications device based at least in part on the indication.

Aspect 35: The method of any of aspects 31 through 34, wherein the scheduling request is received using a group identifier associated with network coding packet transmission.

Aspect 36: The method of any of aspects 31 through 35, wherein the scheduling request is received on a resource associated with network coding packet transmission.

Aspect 37: The method of aspect 36, further comprising: receiving, from the wireless communications device, an indication that the wireless communications device is capable of network coding packet transmission; and transmitting, in response to the indication, control signaling to the wireless communications device configuring the resource associated with network coding packet transmission.

Aspect 38: The method of any of aspects 36 through 37, wherein the resource associated with network coding packet transmission is unique to the wireless communications device or is configured for a group of wireless communications device s including the wireless communications device.

Aspect 39: The method of aspect 30, wherein receiving the request comprises: receiving a buffer status report associated with network coding packet transmission.

Aspect 40: The method of aspect 39, wherein a bit in the buffer status report indicates that the buffer status report is associated with network coding packet transmission.

Aspect 41: The method of any of aspects 30 through 40, wherein receiving the request comprises: receiving negative acknowledgment feedback associated with a plurality of packets for the plurality of UEs.

Aspect 42: The method of aspect 41, wherein the negative acknowledgment feedback includes an identifier associated with network coding packet transmission.

Aspect 43: The method of aspect 42, wherein the identifier is associated with a packet identifier of the network coding packet.

Aspect 44: The method of any of aspects 30 through 43, further comprising: transmitting control signaling to the wireless communications device configuring a dedicated resource for the request that is associated with network coding packet transmission, wherein the request is received on the dedicated resource.

Aspect 45: The method of aspect 44, wherein the request includes one or more source identifiers of the set of transport blocks to be encoded in the network coding packet and one or more packet identifiers of the set of transport blocks to be encoded in the network coding packet.

Aspect 46: The method of aspect 45, wherein the request includes one or more additional source identifiers of additional transport blocks to be encoded in additional network coding packets, and one or more additional packet identifiers of the additional transport blocks.

Aspect 47: The method of any of aspects 30 through 46, wherein the request is received periodically.

Aspect 48: The method of any of aspects 30 through 47, wherein transmitting the grant comprises: transmitting downlink control information including the grant, wherein the downlink control information indicates the set of transport blocks to encode for the network coding packet and a set of destination identifiers of the plurality of UEs.

Aspect 49: The method of any of aspects 30 through 48, wherein transmitting the grant comprises: transmitting a radio resource control configuration message including the grant, wherein the radio resource control configuration message indicates the set of transport blocks to be encoded in the network coding packet and a set of destination identifiers of the plurality of UEs.

Aspect 50: The method of any of aspects 30 through 49, wherein the grant indicates that the set of resources are for network coding packet transmission.

Aspect 51: The method of aspect 50, wherein the grant indicates that the set of resources are for network coding signaling based at least in part on a radio network temporary identifier associated with network coding packet transmission.

Aspect 52: The method of any of aspects 50 through 51, wherein the grant indicates that the set of resources are for network coding packet transmission based at least in part on a field included with the grant.

Aspect 53: The method of any of aspects 50 through 52, wherein the grant indicates that the set of resources are for network coding packet transmission based at least in part on a format of downlink control information comprising the grant.

Aspect 54: The method of any of aspects 30 through 53, wherein the grant is transmitted using unicast signaling or multicast signaling.

Aspect 55: The method of any of aspects 30 through 54, further comprising: receiving, from a first UE of the plurality of UEs, a negative acknowledgment for at least a first packet transmitted by a second UE to the first UE; receiving, from the second UE, an acknowledgment for at least the first packet; and refraining from allocating a resource to the second UE for retransmitting at least the first packet based at least in part on receiving the acknowledgment.

Aspect 56: An apparatus for wireless communications at a wireless communications device, comprising a processor; memory coupled with the processor: and instructions stored in the memory and executable by the processor to cause the apparatus to perform a method of any of aspects 1 through 29.

Aspect 57: An apparatus for wireless communications at a wireless communications device, comprising at least one means for performing a method of any of aspects 1 through 29.

Aspect 58: A non-transitory computer-readable medium storing code for wireless communications at a wireless communications device, the code comprising instructions executable by a processor to perform a method of any of aspects 1 through 29.

Aspect 59: An apparatus for wireless communications at a base station, comprising a processor: memory coupled with the processor; and instructions stored in the memory and executable by the processor to cause the apparatus to perform a method of any of aspects 30 through 55.

Aspect 60: An apparatus for wireless communications at a base station, comprising at least one means for performing a method of any of aspects 30 through 55.

Aspect 61: A non-transitory computer-readable medium storing code for wireless communications at a base station, the code comprising instructions executable by a processor to perform a method of any of aspects 30 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless communications device, comprising:
    transmitting, to a network entity, a request for resources to transmit, by the wireless communications device and to a first plurality of user equipment (UEs), a network coding message that includes a network coding packet that is representative of a set of transport blocks that are coded together via application of an algebraic function to the set of transport blocks, wherein the set of transport blocks are previously transmitted by a second plurality of UEs;
    receiving, from the network entity and responsive to the request, a grant allocating a set of resources for network coding packet transmission; and
    transmitting the network coding message to the first plurality of UEs on the set of resources in accordance with the grant.

2. The method of claim 1, wherein transmitting the request comprises:

transmitting a scheduling request associated with network coding packet transmission.

3. The method of claim 2, wherein transmitting the scheduling request further comprises:
transmitting, as the scheduling request, a sequence associated with network coding packet transmission.

4. The method of claim 3, further comprising:
receiving, from the network entity and prior to transmission of the scheduling request, an indication of the sequence, wherein the sequence is associated with the wireless communications device based at least in part on the indication.

5. The method of claim 2, wherein the scheduling request is transmitted using a group identifier associated with network coding packet transmission.

6. The method of claim 2, wherein the scheduling request is transmitted on a resource associated with network coding packet transmission.

7. The method of claim 6, further comprising:
transmitting, to the network entity, an indication that the wireless communications device is capable of network coding packet transmission; and
receiving, in response to the indication, control signaling from the network entity configuring the resource associated with network coding packet transmission.

8. The method of claim 6, wherein the resource associated with network coding packet transmission is unique to the wireless communications device or is configured for a group of wireless communications devices including the wireless communications device.

9. The method of claim 1, wherein transmitting the request comprises:
transmitting a buffer status report associated with network coding packet transmission.

10. The method of claim 9, wherein a bit in the buffer status report indicates that the buffer status report is associated with network coding packet transmission.

11. The method of claim 1, wherein transmitting the request comprises:
transmitting negative acknowledgment feedback associated with a plurality of packets for the first plurality of UEs.

12. The method of claim 11, wherein the negative acknowledgment feedback includes an identifier associated with network coding packet transmission.

13. The method of claim 1, further comprising:
receiving control signaling from the network entity configuring a dedicated resource for the request that is associated with network coding packet transmission, wherein the request is transmitted on the dedicated resource.

14. The method of claim 13, wherein the request includes one or more source identifiers of the set of transport blocks to be encoded in the network coding packet and one or more packet identifiers of the set of transport blocks to be encoded in the network coding packet.

15. The method of claim 1, wherein transmitting the request comprises:
periodically transmitting the request.

16. The method of claim 1, further comprising:
detecting a trigger to transmit the request, wherein the request is transmitted based at least in part on detecting the trigger.

17. The method of claim 1, wherein receiving the grant comprises:
receiving downlink control information including the grant, wherein the downlink control information indicates the set of transport blocks to encode for the network coding packet and a set of destination identifiers of the first plurality of UEs.

18. The method of claim 1, wherein receiving the grant comprises:
receiving a radio resource control configuration message including the grant, wherein the radio resource control configuration message indicates the set of transport blocks to be encoded in the network coding packet and a set of destination identifiers of the first plurality of UEs.

19. The method of claim 1, wherein the grant indicates that the set of resources are for network coding packet transmission based at least in part on a radio network temporary identifier associated with network coding packet transmission, a field included with the grant, a format of downlink control information comprising the grant, or any combination thereof.

20. The method of claim 1, wherein the request includes a set of transport block source identifiers for the set of transport blocks and a set of transport block packet identifiers for the set of transport blocks, and the network coding message includes one or more transport blocks of the set of transport blocks.

21. The method of claim 1, further comprising:
receiving, from a source UE, a second request to transmit the network coding message that includes the network coding packet, wherein the request for the resources is transmitted to the network entity based at least in part on receiving the second request from the source UE.

22. The method of claim 1, further comprising:
receiving a plurality of packets from the first plurality of UEs, wherein the network coding message includes the network coding packet and one or more packets of the plurality of packets.

23. A method for wireless communications at a network entity, comprising:
receiving, from a wireless communications device, a request for resources for the wireless communications device to transmit, by the wireless communications device to a first plurality of user equipment (UEs), a network coding message that includes a network coding packet that is representative of a set of transport blocks that are coded together via application of an algebraic function to the set of transport blocks, wherein the set of transport blocks are previously transmitted by a second plurality of UEs; and
transmitting, to the wireless communications device and responsive to the request, a grant allocating a set of resources for network coding packet transmission.

24. The method of claim 23, wherein receiving the request comprises:
receiving a scheduling request or a buffer status report associated with network coding packet transmission.

25. The method of claim 23, further comprising:
transmitting control signaling to the wireless communications device configuring a dedicated resource for the request that is associated with network coding packet transmission, wherein the request is received on the dedicated resource.

26. The method of claim 23, wherein transmitting the grant comprises:
transmitting downlink control information including the grant, wherein the downlink control information indicates the set of transport blocks to encode for the network coding packet and a set of destination identifiers of the first plurality of UEs.

27. The method of claim 23, wherein transmitting the grant comprises:
   transmitting a radio resource control configuration message including the grant, wherein the radio resource control configuration message indicates the set of transport blocks to be encoded in the network coding packet and a set of destination identifiers of the first plurality of UEs.

28. The method of claim 23, further comprising:
   receiving, from a first UE of the first plurality of UEs, a negative acknowledgment for at least a first packet transmitted by a second UE to the first UE;
   receiving, from the second UE, an acknowledgment for at least the first packet; and
   refraining from allocating a resource to the second UE for retransmitting at least the first packet based at least in part on receiving the acknowledgment.

29. An apparatus for wireless communications at a wireless communications device, comprising:
   one or more processors;
   one or more memories coupled with the one or more processors; and
   instructions stored in the one or more memories and executable by the one or more processors to cause the apparatus to:
      transmit, to a network entity, a request for resources to transmit, by the wireless communications device and to a first plurality of user equipment (UEs), a network coding message that includes a network coding packet that is representative of a set of transport blocks that are coded together via application of an algebraic function to the set of transport blocks, wherein the set of transport blocks are previously transmitted by a second plurality of UEs;
      receive, from the network entity and responsive to the request, a grant allocating a set of resources for network coding packet transmission; and
      transmit the network coding message to the first plurality of UEs on the set of resources in accordance with the grant.

30. An apparatus for wireless communications at a network entity, comprising:
   one or more processors;
   one or more memories coupled with the one or more processors; and
   instructions stored in the one or more memories and executable by the one or more processors to cause the apparatus to:
      receive, from a wireless communications device, a request for resources for the wireless communications device to transmit, by the wireless communications device to a first plurality of user equipment (UEs), a network coding message that includes a network coding packet that is representative of a set of transport blocks that are coded together via application of an algebraic function to the set of transport blocks, wherein the set of transport blocks are previously transmitted by a second plurality of UEs; and
      transmit, to the wireless communications device and responsive to the request, a grant allocating a set of resources for network coding packet transmission.

* * * * *